(12) United States Patent
Hannuksela

(10) Patent No.: US 8,532,194 B2
(45) Date of Patent: Sep. 10, 2013

(54) PICTURE DECODING METHOD

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 870 days.

(21) Appl. No.: 10/782,372

(22) Filed: Feb. 18, 2004

(65) Prior Publication Data

US 2004/0228413 A1  Nov. 18, 2004

Related U.S. Application Data

(60) Provisional application No. 60/448,189, filed on Feb. 18, 2003.

(51) Int. Cl.
*H04N 7/12* (2006.01)
*H04N 11/02* (2006.01)
*H04N 11/04* (2006.01)

(52) U.S. Cl.
USPC .............................. 375/240.25; 375/240.01

(58) Field of Classification Search
USPC ....................................... 375/240.01, 240.25
See application file for complete search history.

(56) References Cited

U.S. PATENT DOCUMENTS

| | | | |
|---|---|---|---|
| 5,122,875 A * | 6/1992 | Raychaudhuri et al. ... | 348/390.1 |
| 5,313,186 A | 5/1994 | Schuhl et al. | |
| 5,378,683 A | 1/1995 | Cabanel et al. | |
| 5,387,941 A | 2/1995 | Montgomery et al. ....... | 348/473 |
| 5,398,072 A | 3/1995 | Auld | |
| 5,467,173 A | 11/1995 | Sakata et al. | |
| 5,481,543 A | 1/1996 | Veltman | |
| 5,481,643 A | 1/1996 | Ten Kate et al. ............. | 395/2.36 |
| 5,486,864 A | 1/1996 | Zdepski | |
| 5,517,250 A * | 5/1996 | Hoogenboom et al. . | 375/240.27 |
| 5,677,905 A * | 10/1997 | Bigham et al. ........... | 370/395.21 |
| 5,719,632 A | 2/1998 | Hoang et al. | |
| 5,815,600 A | 9/1998 | Sano et al. .................... | 382/232 |

(Continued)

FOREIGN PATENT DOCUMENTS

| | | |
|---|---|---|
| CN | 1279856 A | 1/2001 |
| CN | 1280743 | 1/2001 |

(Continued)

OTHER PUBLICATIONS

Wang, Wei-qieng and Gao, Wen, An Index Model for MPEG-2 Streams and Its Application, Journal of Software 12(8), 1212-1219 (2001).

(Continued)

*Primary Examiner* — Chikaodili E Anyikire
(74) *Attorney, Agent, or Firm* — Alston & Bird LLP

(57) ABSTRACT

The invention relates to a method for ordering encoded pictures consisting of an encoding step for forming encoded pictures in an encoder. At least one group of pictures is formed of the pictures and a picture ID is defined for each picture of the group of pictures. In the method a transmission step is performed for transmitting said encoded pictures to a decoder. The encoded pictures are rearranged in decoding order and decoded for forming decoded pictures. In the encoding step a video sequence ID separate from the picture ID is defined for the encoded pictures, the video sequence ID being the same for each picture of the same group of pictures. In the decoding step the video sequence ID is used for determining which pictures belong to the same group of pictures. The invention also relates to a system, encoder, decoder, electronic device, software program and a storage medium.

19 Claims, 11 Drawing Sheets

Three-layer recursive temporal scalability

Decoding of two layers from the three-layersequence above

(56) References Cited

U.S. PATENT DOCUMENTS

| | | | |
|---|---|---|---|
| 5,822,024 A * | 10/1998 | Setogawa et al. | 348/425.1 |
| 5,877,812 A | 3/1999 | Karuse et al. | |
| 5,892,924 A | 4/1999 | Lyon et al. | |
| 6,011,590 A | 1/2000 | Saukkonen | |
| 6,023,233 A | 2/2000 | Craven et al. | |
| 6,141,785 A | 10/2000 | Hur et al. | 714/748 |
| 6,188,700 B1 | 2/2001 | Kato et al. | |
| 6,191,581 B1 | 2/2001 | Van Dau et al. | |
| 6,269,080 B1 | 7/2001 | Kumar | |
| 6,289,129 B1 | 9/2001 | Chen et al. | 382/232 |
| 6,291,993 B1 | 9/2001 | Fert et al. | |
| 6,493,388 B1 | 12/2002 | Wang | |
| 6,496,004 B1 | 12/2002 | Nguyen Van Dau et al. | |
| 6,496,980 B1 * | 12/2002 | Tillman et al. | 725/90 |
| 6,526,022 B1 | 2/2003 | Chiu et al. | 370/229 |
| 6,618,438 B1 * | 9/2003 | Le Roux et al. | 375/240.12 |
| 6,625,320 B1 | 9/2003 | Nilsson et al. | |
| 6,628,719 B1 | 9/2003 | Kono et al. | |
| 6,697,426 B1 | 2/2004 | Van Der Schaar et al. | |
| 6,754,275 B1 * | 6/2004 | Yasuda et al. | 375/240.25 |
| 6,782,490 B2 | 8/2004 | Maxemchuk et al. | 714/18 |
| 6,873,786 B2 | 3/2005 | Lin et al. | 386/68 |
| 6,950,466 B2 | 9/2005 | Kim et al. | |
| 7,072,404 B2 | 7/2006 | Itokawa | |
| 7,289,500 B1 | 10/2007 | Amlekar | |
| 7,296,205 B2 | 11/2007 | Curcio et al. | |
| 7,301,944 B1 | 11/2007 | Redmond | |
| 7,356,079 B2 | 4/2008 | Laksono et al. | |
| 7,495,867 B2 | 2/2009 | Sbiaa et al. | |
| 7,526,523 B2 | 4/2009 | Nekovee et al. | |
| 7,551,672 B1 | 6/2009 | Tahara et al. | |
| 7,809,240 B2 | 10/2010 | Nomura | |
| 8,108,747 B2 | 1/2012 | Curcio et al. | |
| 8,160,134 B2 | 4/2012 | Tahara et al. | |
| 2001/0049291 A1 | 12/2001 | Sato et al. | |
| 2002/0003799 A1 * | 1/2002 | Tomita | 370/392 |
| 2002/0004840 A1 | 1/2002 | Harumoto et al. | |
| 2002/0071485 A1 | 6/2002 | Caglar et al. | |
| 2002/0095636 A1 | 7/2002 | Tatsumi et al. | 714/748 |
| 2002/0105951 A1 | 8/2002 | Hannuksela et al. | |
| 2002/0174442 A1 | 11/2002 | Nomura | |
| 2003/0031175 A1 | 2/2003 | Hayashi et al. | 370/390 |
| 2003/0135784 A1 | 7/2003 | Yamaguchi et al. | 714/18 |
| 2003/0138043 A1 | 7/2003 | Hannuksela | 375/240.08 |
| 2003/0142689 A1 | 7/2003 | Haberman et al. | |
| 2003/0169815 A1 * | 9/2003 | Aggarwal et al. | 375/240.12 |
| 2004/0005007 A1 | 1/2004 | Viscito et al. | |
| 2004/0010802 A1 | 1/2004 | Visharam et al. | 725/95 |
| 2004/0039796 A1 * | 2/2004 | Watkins | 709/218 |
| 2004/0205071 A1 | 10/2004 | Uesugi et al. | |
| 2004/0223551 A1 | 11/2004 | Hannuksela | |
| 2005/0123055 A1 | 6/2005 | Winger | |
| 2005/0135020 A1 | 6/2005 | Sugita et al. | |
| 2005/0201471 A1 | 9/2005 | Hannuksela | |
| 2006/0072597 A1 | 4/2006 | Hannuksela | |
| 2007/0002503 A1 | 1/2007 | Sbiaa et al. | |
| 2007/0030603 A1 | 2/2007 | Sato et al. | |
| 2007/0035888 A1 | 2/2007 | Sbiaa et al. | |
| 2007/0086120 A1 | 4/2007 | Shimazawa et al. | |
| 2007/0159164 A1 | 7/2007 | Hehn et al. | |
| 2009/0122658 A1 | 5/2009 | Gaudin et al. | |
| 2009/0128965 A1 | 5/2009 | Mizuno et al. | |
| 2011/0019747 A1 | 1/2011 | Hannuksela | |

FOREIGN PATENT DOCUMENTS

| | | |
|---|---|---|
| CN | 1280753 A | 1/2001 |
| CN | 1358388 A | 7/2002 |
| EP | 0 944 269 | 9/1999 |
| EP | 0 949 819 | 10/1999 |
| EP | 0 981 249 | 2/2000 |
| EP | 1069777 | 1/2001 |
| EP | 1 146 683 | 10/2001 |
| EP | 1146683 | 10/2001 |
| EP | 1185033 | 3/2002 |
| EP | 1 379 085 | 1/2004 |
| FR | 2852399 A1 | 9/2004 |
| GB | 12287383 | 9/1995 |
| JP | 2001045020 | 2/2001 |
| JP | 2001298407 | 10/2001 |
| JP | 2002-112265 | 4/2002 |
| JP | 2002-330379 | 11/2002 |
| JP | 2002359641 | 12/2002 |
| JP | 2003008642 | 1/2003 |
| RU | 2 115 261 | 7/1998 |
| RU | 2 189 072 | 9/2002 |
| WO | WO 96/20575 | 7/1996 |
| WO | WO 97/28505 | 8/1997 |
| WO | WO-9801764 A1 | 1/1998 |
| WO | WO 99/16225 | 4/1999 |
| WO | WO-9927379 A1 | 6/1999 |
| WO | WO-0036429 A1 | 6/2000 |
| WO | WO-00/46995 | 10/2000 |
| WO | WO-00/67469 A1 | 11/2000 |
| WO | WO 2004/019530 | 3/2004 |
| WO | WO 2004/075555 | 9/2004 |
| WO | WO-2004083881 A1 | 9/2004 |

OTHER PUBLICATIONS

Network Working Group, S. Wenger et al.; "RTP Payload Format for H.264 Video;" whole document; Aug. 2004.

ISO/IEC 2382-1:1993; "Information Technology Vocabulary. Fundamental Terms;" www.morepc.ru/informatisation/iso2381-1.html; Feb. 15, 1994.

Wenger, S., et al.; "RTP payload Format for H.264 Video;" Internet Draft draft-ietf-avt-rtp-h264-04.txt; Feb. 10, 2004; p. 29-42.

Wenger, S., et al.; "RTP payload format for H.264 Video;" Internet Draft draft-ietf-avt-rtp-h264-11.txt; Aug. 2004.

Wenger, S., et al.; "RTP payload Format for JVT Video;" Internet Draft draft-ietf-avt-rtp-h264-01.txt; Aug. 2003.

Joint Video Team (JVT) of ISO/IEC MPEG and ITU/T VCEG; "HRD Editor's Input to Final Committee Draft (FCD) of joint Video Specification (ITU-T Rec. H.264 / ISO/IEC 14496-10 AVC) regarding Hypothetical Reference Decoder;" 4th Meeting: Klagenfurt, Austria; Jul. 22-26, 2002; p. 1-18.

Joint Video Team (JVT) of ISO/IEC MPEG and ITU/T VCEG; "Study of Final Committee Draft of Joint Video Specification, JVT-F100;" 6th Meeting: Awaji Island, JP; Dec. 5-13, 2002; p. 169-170, 176-178, 182.

Swedish Patent Office; Henrik Andersson; "International Search Report;" whole document; Jun. 14, 2004.

Patent Office of the People's Republic of China; Li Ping; "First Office Action;" whole document; Mar. 7, 2008; English translation only.

Mexican Patent Office; "Official Action;" whole document; May 28, 2008; with partial English translation.

Swedish Patent Office; Jesper Bergstrand; "International Search Report;" whole document; Jun. 8, 2005.

Japanese Patent Office; Masaru Kawasaki; "Notice of Reasons for Rejection;" whole document; Nov. 24, 2009; with English translation.

Danish Patent and Trademark Office; "Singapore Search Report;" whole document; Jun. 25, 2008.

Federal Service for Intellectual Property, Patents and Trademarks (Patent Office of the Russian Federation); "Decision to Grant a Patent for an Invention;" whole document; Oct. 1, 2009; with English translation.

Federal Service for Intellectual Property, Patents and Trademarks (Patent Office of the Russian Federation); "Decision on Grant of a Patent for Invention;" whole document; Jun. 5, 2009; with English translation.

Federal Service for Intellectual Property, Patents and Trademarks (Patent Office of the Russian Federation); "Official Action (Enquiry) of the State Examination;" whole document; Oct. 10, 2008; English translation only.

Canadian Intellectual Property Office; "Office Action;" whole document; Jul. 15, 2009.

Patent Office of the People's Republic of China; L. Ping; "First Office Action"; whole document (40 pages); Mar. 7, 2008; English translation only.

Network Working Group; M. Luby et al.; "Asynchronous Layered Coding (ALC) Protocol Instantiation"; whole document (34 pages); Dec. 2002.

RMT Working Group; B. Adamson et al.; "NACK-Oriented Reliable Multicast Protocol (NORM)"; whole document (69 pages); Jan. 2004.

Network Working Group; M. Luby et al.; "Forward Error Correction (FEC) Building Block"; whole document (16 pages); Dec. 2002.

RMT, Internet-Draft; T. Paila et al.; "FLUTE—File Delivery over Unidirectional Transport"; whole document (32 pages); Dec. 11, 2003.

3GPP TS 23.246 V.6.1.0; "$3^{rd}$ Generation Partnership Project; Technical Specification Group Services and System Aspects; Multimedia Broadcast/Multicast Service (MBMS); Architecture and functional description (Release 6)"; whole document (38 pages); Dec. 2003.

Swedish Patent Office; N. Sebaa; "International Search Report and Written Opinion of the International Searching Authority"; whole document (11 pages); May 25, 2005.

Japanese Patent Office; N. Yagashira; "Notification of Ground of Rejection"; whole document (17 pages) including English translation; Oct. 23, 2009.

Swedish Patent Office; J. Bergstrand; "International Search Report"; whole document (4 pages); Jun. 8, 2005.

Swedish Patent Office; H. Andersson; "International Search Report"; whole document (2 pages); Jun. 21, 2004.

Canadian Intellectual Property Office Office Action; "Requisition by the Examiner"; whole document; Jul. 15, 2010.

IETF Standard-Working-Draft, Internet Engineering Task Force, IETF, CH, vol. AVT, No. 2; Wenger, M. et al.; "RTP payload Format for H.264 Video; draft-ietf-avt-rtp-h264-02.txt"; whole document; Jun. 2003.

European Patent Office; Berthele, P.; "Communication pursuant to Article 94(3) EPC"; whole document; Mar. 9, 2011.

Wenger, et al; "RTP Payload Format for H.264 Video; draft-ietf-avt-rtp-h264-02.txt"; IETF StandardWorking-Draft, Internet Engineering Task Force, IETF, CH; vol. AVT, No. 2, Jul. 2, 2003, XP015001402, ISSN: 0000-0004; whole document.

Hannuksela, M.; "Signaling of Enhanced GOPs"; ITU Study Group 16—Video Coding Experts Group—ISA/IEC MPEG & ITU-T VCEG(ISO/IEC JTC1/SC29/WG11 and ITU-T SG16 Q6); No. JVT-D098; Jul. 26, 2002; whole document; XP030005372.

Hannuksela, M.; "On NAL Unit Order"; ITU Study Group 16—Video Coding Experts Group—ISO/IEC MPEG & ITU-T VCEG(ISO/IEC JTC1/SC29NVG11 and ITU-T SG16 Q6); No. JVT-D093; Jul. 26, 2002; whole document; XP030005367.

Sullivan, G.; "Q.6/16 Report of Activities at Interim Meetings in Klagenfurt, Austria, May 6-10, 2002; TD 10"; ITU-T Draft Study Period 2001-2004, International Telecommunication Union, Geneva; CH, vol. Study Group 16; pp. 1-75; XP017429861.

European Patent Office; Montoneri, F.; "Communication pursuant to Article 94(3)EPC"; whole document; Mar. 9, 2011; Munich, Germany.

Canadian Intellectual Property Office; "Requisition by the Examiner"; whole document; Aug. 20, 2010.

European Office Action dated Mar. 7, 2012 issued in European Patent Application 04 711 623.1; 6 pages.

Wenger, et al; "RTP Payload Format for JVT Video; draft-ietf-avt-rtp-h264-00.txt"; IETF Standard-Working-Draft, vol. avt, Sep. 1, 2002, XP015015799, ISSN: 0000-0004; pp. 1-16.

Van Der Meer, et al; "RTP Payload Format for Transport of MPEG-4 Elementary Streams; draft-ietf-avtmpeg4-simple-07.txt"; IETFf Standard-Working-Draft, Internet Engineering Task Force; Feb. 1, 2003, XP008139886, ISSN: 0000-0004; pp. 1-41.

Hannuksela, Miska M., "Levels and HRD," ITU Study Group 16—Video Coding Experts Group—ISO/IEC MPEG & ITU-T VCEG (ISO/IEC JTC1/SC29/WG11 and ITU-T SG16 Q6), JVT-0069, May 10, 2002.

Office Action from EP Appl. No. 05708200.0 dated Mar. 23, 2011.

Office Action from Mexican Appl. No. PA/a/2005/008404, dated May 9, 2008.

Stockhammer et al., "H.264/AVC in Wireless Environments," *IEEE Transactions on Circuits and Systems for Video Technology*, vol. 13, No. 7, Jul. 2003, pp. 657-673.

Stockhammer et al., "H.264/JVT Coding Network Abstraction Layer and IP-Based Transport," *Proceedings of the IEEE 2002 International Conference on Image Processing*, Sep. 22-25, 2002, vol. 2, pp. II-485-II-488.

Wang et al., "System and Transport Interface of SVC," *IEEE Transactions on Circuits and Systems for Video Technology*, vol. 17, No. 9, Sep. 2007, pp. 1149-1163.

Wenger et al., "RTP Payload Format for H.264 Video," Internet Draft draft-ietf-avt-rtp-h264-03.txt, IETF Standard-Working-Draft, Internet Engineering Task Force, IETF, CH, vol. AVT, No. 3, Oct. 2003.

Written Opinion from Singapore Application No. SG-2006-05400-1, dated Jul. 30, 2008.

U.S. Appl. No. 60/483,159, filed Jun. 27, 2003.

Japanese Office Action for Application No. 2009-141863, dated Oct. 10, 2012.

\* cited by examiner

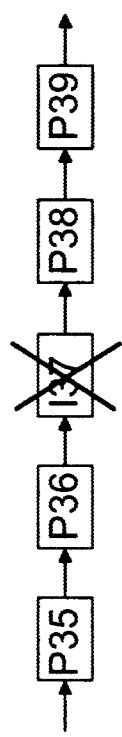
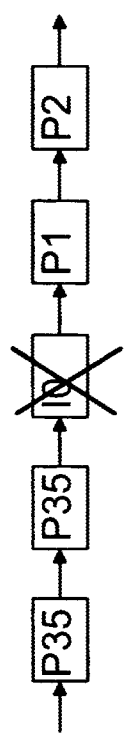

PICTURE DECODING METHOD

CROSS REFERENCE TO RELATED APPLICATIONS

This application claims priority under 35 USC §119 to U.S. Provisional Patent Application No. 60/448,189 filed on Feb. 18, 2003.

FIELD OF THE INVENTION

The present invention relates to a method for ordering encoded pictures, the method consisting of an encoding step for forming encoded pictures in an encoder, an optional hypothetical decoding step for decoding said encoded pictures in the encoder, a transmission step for transmitting said encoded pictures to a decoder, and a rearranging step for arranging the decoded pictures in decoding order. The invention also relates to a system, an encoder, a decoder, a device, a computer program, a signal, a module and a computer program product.

BACKGROUND OF THE INVENTION

Published video coding standards include ITU-T H.261, ITU-T H.263, ISO/IEC MPEG-1, ISO/IEC MPEG-2, and ISO/IEC MPEG-4 Part 2. These standards are herein referred to as conventional video coding standards.
Video Communication Systems Video communication systems can be divided into conversational and non-conversational systems. Conversational systems include video conferencing and video telephony. Examples of such systems include ITU-T Recommendations H.320, H.323, and H.324 that specify a video conferencing/telephony system operating in ISDN, IP, and PSTN networks respectively. Conversational systems are characterized by the intent to minimize the end-to-end delay (from audio-video capture to the far-end audio-video presentation) in order to improve the user experience.

Non-conversational systems include playback of stored content, such as Digital Versatile Disks (DVDs) or video files stored in a mass memory of a playback device, digital TV, and streaming. A short review of the most important standards in these technology areas is given below.

A dominant standard in digital video consumer electronics today is MPEG-2, which includes specifications for video compression, audio compression, storage, and transport. The storage and transport of coded video is based on the concept of an elementary stream. An elementary stream consists of coded data from a single source (e.g. video) plus ancillary data needed for synchronization, identification and characterization of the source information. An elementary stream is packetized into either constant-length or variable-length packets to form a Packetized Elementary Stream (PES). Each PES packet consists of a header followed by stream data called the payload. PES packets from various elementary streams are combined to form either a Program Stream (PS) or a Transport Stream (TS). PS is aimed at applications having negligible transmission errors, such as store-and-play type of applications. TS is aimed at applications that are susceptible of transmission errors. However, TS assumes that the network throughput is guaranteed to be constant.

There is a standardization effort going on in a Joint Video Team (JVT) of ITU-T and ISO/IEC. The work of JVT is based on an earlier standardization project in ITU-T called H.26L. The goal of the JVT standardization is to release the same standard text as ITU-T Recommendation H.264 and ISO/IEC International Standard 14496-10 (MPEG4 Part 10). The draft standard is referred to as the JVT coding standard in this paper, and the codec according to the draft standard is referred to as the JVT codec.

The codec specification itself distinguishes conceptually between a video coding layer (VCL), and a network abstraction layer (NAL). The VCL contains the signal processing functionality of the codec, things such as transform, quantization, motion search/compensation, and the loop filter. It follows the general concept of most of today's video codecs, a macroblock-based coder that utilizes inter picture prediction with motion compensation, and transform coding of the residual signal. The output of the VCL encoder are slices: a bit string that contains the macroblock data of an integer number of macroblocks, and the information of the slice header (containing the spatial address of the first macroblock in the slice, the initial quantization parameter, and similar). Macroblocks in slices are ordered consecutively in scan order unless a different macroblock allocation is specified, using the so-called Flexible Macroblock Ordering syntax. In-picture prediction, such as intra prediction and motion vector prediction, is used only within a slice.

The NAL encapsulates the slice output of the VCL into Network Abstraction Layer Units (NAL units or NALUs), which are suitable for the transmission over packet networks or the use in packet oriented multiplex environments. JVT's Annex B defines an encapsulation process to transmit such NALUs over byte-stream oriented networks.

The optional reference picture selection mode of H.263 and the NEWPRED coding tool of MPEG4 Part 2 enable selection of the reference frame for motion compensation per each picture segment, e.g., per each slice in H.263. Furthermore, the optional Enhanced Reference Picture Selection mode of H.263 and the JVT coding standard enable selection of the reference frame for each macroblock separately.

Reference picture selection enables many types of temporal scalability schemes. FIG. 1 shows an example of a temporal scalability scheme, which is herein referred to as recursive temporal scalability. The example scheme can be decoded with three constant frame rates. FIG. 2 depicts a scheme referred to as Video Redundancy Coding, where a sequence of pictures is divided into two or more independently coded threads in an interleaved manner. The arrows in these and all the subsequent figures indicate the direction of motion compensation and the values under the frames correspond to the relative capturing and displaying times of the frames.
Parameter Set Concept One fundamental design concept of the JVT codec is to generate self-contained packets, to make mechanisms such as the header duplication unnecessary. The way how this was achieved is to decouple information that is relevant to more than one slice from the media stream. This higher layer meta information should be sent reliably, asynchronously and in advance from the RTP packet stream that contains the slice packets. This information can also be sent in-band in such applications that do not have an out-of-band transport channel appropriate for the purpose. The combination of the higher level parameters is called a Parameter Set. The Parameter Set contains information such as picture size, display window, optional coding modes employed, macroblock allocation map, and others.

In order to be able to change picture parameters (such as the picture size), without having the need to transmit Parameter Set updates synchronously to the slice packet stream, the encoder and decoder can maintain a list of more than one Parameter Set. Each slice header contains a codeword that indicates the Parameter Set to be used.

This mechanism allows to decouple the transmission of the Parameter Sets from the packet stream, and transmit them by external means, e.g. as a side effect of the capability exchange, or through a (reliable or unreliable) control protocol. It may even be possible that they get never transmitted but are fixed by an application design specification.

Transmission Order

In conventional video coding standards, the decoding order of pictures is the same as the display order except for B pictures. A block in a conventional B picture can be bi-directionally temporally predicted from two reference pictures, where one reference picture is temporally preceding and the other reference picture is temporally succeeding in display order. Only the latest reference picture in decoding order can succeed the B picture in display order (exception: interlaced coding in H.263 where both field pictures of a temporally subsequent reference frame can precede a B picture in decoding order). A conventional B picture cannot be used as a reference picture for temporal prediction, and therefore a conventional B picture can be disposed without affecting the decoding of any other pictures.

The JVT coding standard includes the following novel technical features compared to earlier standards:

The decoding order of pictures is decoupled from the display order. The value of the frame_num syntax element indicates decoding order and the picture order count indicates the display order.

Reference pictures for a block in a B picture can either be before or after the B picture in display order. Consequently, a B picture stands for a bi-predictive picture instead of a bi-directional picture.

Pictures that are not used as reference pictures are marked explicitly. A picture of any type (intra, inter, B, etc.) can either be a reference picture or a non-reference picture. (Thus, a B picture can be used as a reference picture for temporal prediction of other pictures.)

A picture can contain slices that are coded with a different coding type. In other words, a coded picture may consist of an intra-coded slice and a B-coded slice, for example.

Decoupling of display order from decoding order can be beneficial from compression efficiency and error resiliency point of view.

An example of a prediction structure potentially improving compression efficiency is presented in FIG. 3. Boxes indicate pictures, capital letters within boxes indicate coding types, numbers within boxes are picture numbers according to the JVT coding standard, and arrows indicate prediction dependencies. Note that picture B17 is a reference picture for pictures B18. Compression efficiency is potentially improved compared to conventional coding, because the reference pictures for pictures B18 are temporally closer compared to conventional coding with PBBP or PBBBP coded picture patterns. Compression efficiency is potentially improved compared to conventional PBP coded picture pattern, because part of reference pictures are bi-directionally predicted.

FIG. 4 presents an example of the intra picture postponement method that can be used to improve error resiliency. Conventionally, an intra picture is coded immediately after a scene cut or as a response to an expired intra picture refresh period, for example. In the intra picture postponement method, an intra picture is not coded immediately after a need to code an intra picture arises, but rather a temporally subsequent picture is selected as an intra picture. Each picture between the coded intra picture and the conventional location of an intra picture is predicted from the next temporally subsequent picture. As FIG. 4 shows, the intra picture postponement method generates two independent inter picture prediction chains, whereas conventional coding algorithms produce a single inter picture chain. It is intuitively clear that the two-chain approach is more robust against erasure errors than the one-chain conventional approach. If one chain suffers from a packet loss, the other chain may still be correctly received. In conventional coding, a packet loss always causes error propagation to the rest of the inter picture prediction chain.

Two types of ordering and timing information have been conventionally associated with digital video: decoding and presentation order. A closer look at the related technology is taken below.

A decoding timestamp (DTS) indicates the time relative to a reference clock that a coded data unit is supposed to be decoded. If DTS is coded and transmitted, it serves for two purposes: First, if the decoding order of pictures differs from their output order, DTS indicates the decoding order explicitly. Second, DTS guarantees a certain pre-decoder buffering (buffering of coded data units for a decoder) behavior provided that the reception rate is close to the transmission rate at any moment. In networks where the end-to-end latency varies, the second use of DTS plays no or little role. Instead, received data is decoded as fast as possible provided that there is room in the post-decoder buffer (for buffering of decoded pictures) for uncompressed pictures.

Carriage of DTS depends on the communication system and video coding standard in use. In MPEG-2 Systems, DTS can optionally be transmitted as one item in the header of a PES packet. In the JVT coding standard, DTS can optionally be carried as a part of Supplemental Enhancement Information (SEI), and it is used in the operation of the optional Hypothetical Reference Decoder. In ISO Base Media File Format, DTS is dedicated its own box type, Decoding Time to Sample Box. In many systems, such as RTP-based streaming systems, DTS is not carried at all, because decoding order is assumed to be the same as transmission order and exact decoding time does not play an important role.

H.263 optional Annex U and Annex W.6.12 specify a picture number that is incremented by 1 relative to the previous reference picture in decoding order. In the JVT coding standard, the frame_num syntax element (also referred to as frame number hereinafter) is specified similarly to the picture number of H.263. The JVT coding standard specifies a particular type of an intra picture, called an instantaneous decoding refresh (IDR) picture. No subsequent picture can refer to pictures that are earlier than the IDR picture in decoding order. An IDR picture is often coded as a response to a scene change. In the JVT coding standard, frame number is reset to 0 at an IDR picture, which can in some situations improve error resilience in case of a loss of the IDR picture as is presented in FIGS. 5a and 5b. However, it should be noted that the scene information SEI message of the JVT coding standard can also be used for detecting scene changes.

H.263 picture number can be used to recover the decoding order of reference pictures. Similarly, the JVT frame number can be used to recover the decoding order of frames between an IDR picture (inclusive) and the next IDR picture (exclusive) in decoding order. However, because the complementary reference field pairs (consecutive pictures coded as fields that are of different parity) share the same frame number, their decoding order cannot be reconstructed from the frame numbers.

The H.263 picture number or JVT frame number of a non-reference picture is specified to be equal to the picture or frame number of the previous reference picture in decoding order plus 1. If several non-reference pictures are consecutive in decoding order, they share the same picture or frame number. The picture or frame number of a non-reference picture is also the same as the picture or frame number of the following reference picture in decoding order. The decoding order of consecutive non-reference pictures can be recovered using the Temporal Reference (TR) coding element in H.263 or the Picture Order Count (POC) concept of the JVT coding standard.

A presentation timestamp (PTS) indicates the time relative to a reference clock when a picture is supposed to be displayed. A presentation timestamp is also called a display timestamp, output timestamp, and composition timestamp.

Carriage of PTS depends on the communication system and video coding standard in use. In MPEG-2 Systems, PTS can optionally be transmitted as one item in the header of a PES packet. In the JVT coding standard, PTS can optionally be carried as a part of Supplemental Enhancement Information (SEI), and it is used in the operation of the Hypothetical Reference Decoder. In ISO Base Media File Format, PTS is dedicated its own box type, Composition Time to Sample Box where the presentation timestamp is coded relative to the corresponding decoding timestamp. In RTP, the RTP timestamp in the RTP packet header corresponds to PTS.

Many conventional video coding standards feature the Temporal Reference (TR) coding element that is similar to PTS in many aspects. In some of the conventional coding standards, such as MPEG-2 video, TR is reset to zero at the beginning of a Group of Pictures (GOP). In the JVT coding standard, there is no concept of time in the video coding layer. The Picture Order Count (POC) is specified for each frame and field and it is used similarly to TR in direct temporal prediction of B slices, for example. POC is reset to 0 at an IDR picture.

The RTP sequence number is normally a 16-bit unsigned value in the RTP header that is incremented by one for each RTP data packet sent, and may be used by the receiver to detect packet loss and to restore packet sequence.

Transmission of Multimedia Streams

A multimedia streaming system consists of a streaming server and a number of players, which access the server via a network. The network is typically packet-oriented and provides little or no means to guaranteed quality of service. The players fetch either pre-stored or live multimedia content from the server and play it back in real-time while the content is being downloaded. The type of communication can be either point-to-point or multicast. In point-to-point streaming, the server provides a separate connection for each player. In multicast streaming, the server transmits a single data stream to a number of players, and network elements duplicate the stream only if it is necessary.

When a player has established a connection to a server and requested for a multimedia stream, the server begins to transmit the desired stream. The player does not start playing the stream back immediately, but rather it typically buffers the incoming data for a few seconds. Herein, this buffering is referred to as initial buffering. Initial buffering helps to maintain pauseless playback, because, in case of occasional increased transmission delays or network throughput drops, the player can decode and play buffered data.

In order to avoid unlimited transmission delay, it is uncommon to favor reliable transport protocols in streaming systems. Instead, the systems prefer unreliable transport protocols, such as UDP, which, on one hand, inherit a more stable transmission delay, but, on the other hand, also suffer from data corruption or loss.

RTP and RTCP protocols can be used on top of UDP to control real-time communications. RTP provides means to detect losses of transmission packets, to reassemble the correct order of packets in the receiving end, and to associate a sampling time-stamp with each packet. RTCP conveys information about how large a portion of packets were correctly received, and, therefore, it can be used for flow control purposes.

Transmission Errors

There are two main types of transmission errors, namely bit errors and packet errors. Bit errors are typically associated with a circuit-switched channel, such as a radio access network connection in mobile communications, and they are caused by imperfections of physical channels, such as radio interference. Such imperfections may result into bit inversions, bit insertions and bit deletions in transmitted data. Packet errors are typically caused by elements in packet-switched networks. For example, a packet router may become congested; i.e. it may get too many packets as input and cannot output them at the same rate. In this situation, its buffers overflow, and some packets get lost. Packet duplication and packet delivery in different order than transmitted are also possible but they are typically considered to be less common than packet losses. Packet errors may also be caused by the implementation of the used transport protocol stack. For example, some protocols use checksums that are calculated in the transmitter and encapsulated with source-coded data. If there is a bit inversion error in the data, the receiver cannot end up into the same checksum, and it may have to discard the received packet.

Second (2G) and third generation (3G) mobile networks, including GPRS, UMTS, and CDMA-2000, provide two basic types of radio link connections, acknowledged and non-acknowledged. An acknowledged connection is such that the integrity of a radio link frame is checked by the recipient (either the Mobile Station, MS, or the Base Station Subsystem, BSS), and, in case of a transmission error, a retransmission request is given to the other end of the radio link. Due to link layer retransmission, the originator has to buffer a radio link frame until a positive acknowledgement for the frame is received. In harsh radio conditions, this buffer may overflow and cause data loss. Nevertheless, it has been shown that it is beneficial to use the acknowledged radio link protocol mode for streaming services. A non-acknowledged connection is such that erroneous radio link frames are typically discarded.

Packet losses can either be corrected or concealed. Loss correction refers to the capability to restore lost data perfectly as if no losses had ever been introduced. Loss concealment refers to the capability to conceal the effects of transmission losses so that they should not be visible in the reconstructed video sequence.

When a player detects a packet loss, it may request for a packet retransmission. Because of the initial buffering, the retransmitted packet may be received before its scheduled playback time. Some commercial Internet streaming systems implement retransmission requests using proprietary protocols. Work is going on in IETF to standardize a selective retransmission request mechanism as a part of RTCP.

A common feature for all of these retransmission request protocols is that they are not suitable for multicasting to a large number of players, as the network traffic may increase drastically. Consequently, multicast streaming applications have to rely on non-interactive packet loss control.

Point-to-point streaming systems may also benefit from non-interactive error control techniques. First, some systems may not contain any interactive error control mechanism or they prefer not to have any feedback from players in order to simplify the system. Second, retransmission of lost packets and other forms of interactive error control typically take a larger portion of the transmitted data rate than non-interactive error control methods. Streaming servers have to ensure that interactive error control methods do not reserve a major portion of the available network throughput. In practice, the servers may have to limit the amount of interactive error control operations. Third, transmission delay may limit the number of interactions between the server and the player, as all interactive error control operations for a specific data sample should preferably be done before the data sample is played back.

Non-interactive packet loss control mechanisms can be categorized to forward error control and loss concealment by post-processing. Forward error control refers to techniques in which a transmitter adds such redundancy to transmitted data that receivers can recover at least part of the transmitted data even if there are transmission losses. Error concealment by post-processing is totally receiver-oriented. These methods try to estimate the correct representation of erroneously received data.

Most video compression algorithms generate temporally predicted INTER or P pictures. As a result, a data loss in one picture causes visible degradation in the consequent pictures that are temporally predicted from the corrupted one. Video communication systems can either conceal the loss in displayed images or freeze the latest correct picture onto the screen until a frame which is independent from the corrupted frame is received.

In conventional video coding standards, the decoding order is coupled with the output order. In other words, the decoding order of I and P pictures is the same as their output order, and the decoding order of a B picture immediately follows the decoding order of the latter reference picture of the B picture in output order. Consequently, it is possible to recover the decoding order based on known output order. The output order is typically conveyed in the elementary video bitstream in the Temporal Reference (TR) field and also in the system multiplex layer, such as in the RTP header. Thus, in conventional video coding standards, the presented problem relating to the transmission order different from the decoding order did not exist.

It may be obvious for experts in the field that the decoding order of coded pictures could be reconstructed based on a frame counter within the video bitstream similar to H.263 picture number without a reset to 0 at an IDR picture (as done in the JVT coding standard). However, two problems may occur when that kind of solutions are used:

First, FIG. 5*a* presents a situation in which continuous numbering scheme is used. If, for example, the IDR picture I37 is lost (can not be received/decoded), the decoder continues to decode the succeeding pictures, but it uses a wrong reference picture. This causes error propagation to succeeding frames until the next frame, which is independent from the corrupted frame, is received and decoded correctly. In the example of FIG. 5*b* the frame number is reset to 0 at an IDR picture. Now, in a situation in which IDR picture I0 is lost, the decoder notifies that there is a big gap in picture numbering after the latest correctly decoded picture P36. The decoder can then assume that an error has occurred and can freeze the display to the picture P36 until the next frame which is independent from the corrupted frame is received and decoded.

Second, problems in splicing and sub-sequence removal are evident, if a receiver assumes a pre-defined numbering scheme, such as increment by one for each reference picture in decoding order. The receiver can use the pre-defined numbering scheme for loss detection. Splicing refers to the operation where a coded sequence is inserted into the middle of another coded sequence. An example of a practical use of splicing is insertion of advertisements in a digital TV broadcast. If a pre-defined numbering scheme is expected by the receiver, the transmitter must update the frame counter numbers during the transmission according to the position and frame count of spliced sequences. Similarly, if the transmitter decides not to transmit some sub-sequences to avoid network congestion in an IP packet network, for example, it needs to update the frame counter numbers during the transmission according to the position and frame count of disposed sub-sequences. The details of the sub-sequence concept will be described later in this description.

It may be obvious for experts in the field that the decoding order of NAL units could be reconstructed based on a NAL unit sequence number similar to the RTP sequence number but indicating the decoding order of NAL units instead of transmission order. However, two problems may occur when that kind of solutions are used:

First, in some cases, perfect recovery decoding order is not necessary. For example, SEI messages for a picture can typically be decoded at any order. If the decoder supports arbitrary slice ordering, slices of a picture can be decoded at any order. Consequently, NAL units are received out of NAL unit sequence number order due to unintentional packet scheduling differences in network elements, the receiver may unnecessarily wait for NAL units corresponding to missing NAL unit sequence numbers, even though NAL units with succeeding NAL unit sequence numbers could actually be decoded. This additional delay may decrease the subjective quality experienced in the video communication system in use. Furthermore, it may trigger the use of loss correction or concealment processes unnecessarily.

Second, some NAL units, such as slices for non-reference pictures and SEI NAL units, may be discarded by network elements without affecting the decoding process of other NAL units. Such disposal of NAL units would cause gaps in the received sequence of NAL unit sequence numbers. Conventionally, such as with the RTP sequence number, the receiver assumes a pre-defined numbering scheme, such as increment by one for each NAL unit in decoding order, and uses gaps in the sequence number for loss detection. This use of NAL unit sequence numbers contradicts with the possibility to dispose NAL units without affecting the decoding of other NAL units.

Sub-Sequences

The JVT coding standard also includes a sub-sequence concept, which can enhance temporal scalability compared to the use of non-reference picture so that inter-predicted chains of pictures can be disposed as a whole without affecting the decodability of the rest of the coded stream.

A sub-sequence is a set of coded pictures within a sub-sequence layer. A picture resides in one sub-sequence layer and in one sub-sequence only. A sub-sequence does not depend on any other sub-sequence in the same or in a higher sub-sequence layer. A sub-sequence in layer 0 can be decoded independently of any other sub-sequences and previous long-term reference pictures. FIG. 6*a* discloses an example of a picture stream containing sub-sequences at layer 1.

A sub-sequence layer contains a subset of the coded pictures in a sequence. Sub-sequence layers are numbered with non-negative integers. A layer having a larger layer number is a higher layer than a layer having a smaller layer number. The layers are ordered hierarchically based on their dependency on each other so that a layer does not depend on any higher layer and may depend on lower layers. In other words, layer 0 is independently decodable, pictures in layer 1 may be predicted from layer 0, pictures in layer 2 may be predicted from layers 0 and 1, etc. The subjective quality is expected to increase along with the number of decoded layers.

The sub-sequence concept is included in the JVT coding standard as follows: The required_frame_num_update_behaviour_flag equal to 1 in the sequence parameter set signals that the coded sequence may not contain all sub-sequences. The usage of the required_frame_num_update_behaviour_flag releases the requirement for the frame number increment of 1 for each reference frame. Instead, gaps in frame numbers are marked specifically in the decoded picture buffer. If a "missing" frame number is referred to in inter prediction, a loss of a picture is inferred. Otherwise, frames corresponding to "missing" frame numbers are handled as if they were normal frames inserted to the decoded picture buffer with the sliding window buffering mode. All the pictures in a disposed sub-sequence are consequently assigned a "missing" frame number in the decoded picture buffer, but they are never used in inter prediction for other sub-sequences.

The JVT coding standard also includes optional sub-sequence related SEI messages. The sub-sequence information SEI message is associated with the next slice in decoding order. It signals the sub-sequence layer and sub-sequence identifier (sub_seq_id) of the sub-sequence to which the slice belongs.

The slice header of each IDR picture contains an identifier (idr_pic_id). If two IDR pictures are consecutive in decoding order, without any intervening picture, the value of idr_pic_id shall change from the first IDR picture to the other one. If the current picture resides in a sub-sequence whose first picture in decoding order is an IDR picture, the value of sub_seq_id shall be the same as the value of idr_pic_id of the IDR picture.

Decoding order of coded pictures in the JVT coding standard cannot generally be reconstructed based on frame numbers and sub-sequence identifiers. If transmission order differed from decoding order and coded pictures resided in sub-sequence layer 1, their decoding order relative to pictures in sub-sequence layer 0 could not be concluded based on sub-sequence identifiers and frame numbers. For example, consider the following coding scheme presented on FIG. 6b where output order runs from left to right, boxes indicate pictures, capital letters within boxes indicate coding types, numbers within boxes are frame numbers according to the JVT coding standard, underlined characters indicate non-reference pictures, and arrows indicate prediction dependencies. If pictures are transmitted in order I0, P1, P3, I0, P1, B2, B4, P5, it cannot be concluded to which independent group of pictures (independent GOP) picture B2 belongs. An independent GOP is a group of pictures which can be decoded correctly without any other pictures from other group of pictures.

It could be argued that in the previous example the correct independent GOP for picture B2 could be concluded based on its output timestamp. However, the decoding order of pictures cannot be recovered based on output timestamps and picture numbers, because decoding order and output order are decoupled. Consider the following example (FIG. 6c) where output order runs from left to right, boxes indicate pictures, capital letters within boxes indicate coding types, numbers within boxes are frame numbers according to the JVT coding standard, and arrows indicate prediction dependencies. If pictures are transmitted out of decoding order, it cannot be reliably detected whether picture P4 should be decoded after P3 of the first or second independent GOP in output order.

Primary and Redundant Pictures

A primary coded picture is a primary coded representation of a picture. The decoded primary coded picture covers the entire picture area, i.e., the primary coded picture contains all slices and macroblocks of the picture. A redundant coded picture is a redundant coded representation of a picture or a part of a picture that is not used for decoding unless the primary coded picture is missing or corrupted. The redundant coded picture is not required contain all macroblocks in the primary coded picture.

Buffering

Streaming clients typically have a receiver buffer that is capable of storing a relatively large amount of data. Initially, when a streaming session is established, a client does not start playing the stream back immediately, but rather it typically buffers the incoming data for a few seconds. This buffering helps to maintain continuous playback, because, in case of occasional increased transmission delays or network throughput drops, the client can decode and play buffered data. Otherwise, without initial buffering, the client has to freeze the display, stop decoding, and wait for incoming data. The buffering is also necessary for either automatic or selective retransmission in any protocol level. If any part of a picture is lost, a retransmission mechanism may be used to resend the lost data. If the retransmitted data is received before its scheduled decoding or playback time, the loss is perfectly recovered.

Coded pictures can be ranked according to their importance in the subjective quality of the decoded sequence. For example, non-reference pictures, such as conventional B pictures, are subjectively least important, because their absence does not affect decoding of any other pictures. Subjective ranking can also be made on data partition or slice group basis. Coded slices and data partitions that are subjectively the most important can be sent earlier than their decoding order indicates, whereas coded slices and data partitions that are subjectively the least important can be sent later than their natural coding order indicates. Consequently, any retransmitted parts of the most important slice and data partitions are more likely to be received before their scheduled decoding or playback time compared to the least important slices and data partitions.

SUMMARY OF THE INVENTION

The invention enables reordering of video data from transmission order to decoding order in video communication schemes where it is advantageous to transmit data out of decoding order.

In the present invention, in-band signalling of decoding order is conveyed from the transmitter to the receiver. The signalling may be complementary or substitutive to any signalling, such as frame numbers in the JVT coding standard, within the video bitstream that can be used to recover decoding order.

Complementary signalling to frame numbers in the JVT coding standard is presented in the following. Hereinafter, an independent GOP consists of pictures from an IDR picture (inclusive) to the next IDR picture (exclusive) in decoding order. Each NAL unit in the bitstream includes or is associated with a video sequence ID that remains unchanged for all NAL units within an independent GOP.

Video sequence ID of an independent GOP shall differ from the video sequence ID of the previous independent GOP in decoding order freely or it shall be incremented compared to the previous video sequence ID (in modulo arithmetic). In the former case, the decoding order of independent GOPs is determined by their reception order. For example, the independent GOP starting with the IDR picture that has the smallest RTP sequence number is decoded first. In the latter case, the independent GOPs are decoded in ascending order of video sequence IDs.

In the following description the invention is described by using encoder-decoder based system, but it is obvious that the invention can also be implemented in systems in which the video signals are stored. The stored video signals can be either uncoded signals stored before encoding, as encoded signals stored after encoding, or as decoded signals stored after encoding and decoding process. For example, an encoder produces bitstreams in decoding order. A file system receives audio and/or video bitstreams which are encapsulated e.g. in decoding order and stored as a file. In addition, the encoder and the file system can produce metadata which informs subjective importance of the pictures and NAL units, contains information on sub-sequences, inter alia. The file can be stored into a database from which a direct playback server can read the NAL units and encapsulate them into RTP packets. According to the optional metadata and the data connection in use, the direct playback server can modify the transmission order of the packets different from the decoding order, remove sub-sequences, decide what SEI-messages will be transmitted, if any, etc. In the receiving end the RTP packets are received and buffered. Typically, the NAL units are first reordered into correct order and after that the NAL units are delivered to the decoder.

According to the H.264 standard VCL NAL units are specified as those NAL units having nal_unit_type equal to 1 to 5, inclusive. In the standard the NAL unit types 1 to 5 are defined as follows:
1 Coded slice of a non-IDR picture
2 Coded slice data partition A
3 Coded slice data partition B
4 Coded slice data partition C
5 Coded slice of an IDR picture Substitutive signalling to any decoding order information in the video bitstream is presented in the following according to an advantageous embodiment of the present invention. A Decoding Order Number (DON) indicates the decoding order of NAL units, in other the delivery order of the NAL units to the decoder. Hereinafter, DON is assumed to be a 16-bit unsigned integer without the loss of generality. Let DON of one NAL unit be D1 and DON of another NAL unit be D2. If D1<D2 and D2D1<32768, or if D1>D2 and D1−D2>=32768, then the NAL unit having DON equal to D1 precedes the NAL unit having DON equal to D2 in NAL unit delivery order. If D1<D2 and D2−D1>=32768, or if D1>D2 and D1−D2<32768, then the NAL unit having DON equal to D2 precedes the NAL unit having DON equal to D1 in NAL unit delivery order. NAL units associated with different primary coded pictures do not have the same value of DON. NAL units associated with the same primary coded picture may have the same value of DON. If all NAL units of a primary coded picture have the same value of DON, NAL units of a redundant coded picture associated with the primary coded picture can have a different value of DON than the NAL units of the primary coded picture. The NAL unit delivery order of NAL units having the same value of DON can, for example, be the following:
1. Picture delimiter NAL unit, if any
2. Sequence parameter set NAL units, if any
3. Picture parameter set NAL units, if any
4. SEI NAL units, if any
5. Coded slice and slice data partition NAL units of the primary coded picture, if any
6. Coded slice and slice data partition NAL units of the redundant coded pictures, if any
7. Filler data NAL units, if any
8. End of sequence NAL unit, if any
9. End of stream NAL unit, if any.

According to a first aspect of the present invention there is provided a method primarily characterized in that in the encoding step a video sequence ID separate from the picture ID is defined for the encoded pictures.

According to a second aspect of the present invention there is provided an encoder for encoding pictures and for ordering encoded pictures, comprising an arranger for forming at least one group of pictures of the encoded pictures and defining a picture ID for each picture of the group of pictures, the encoder further comprising a definer for defining a video sequence ID separate from the picture ID for the encoded pictures, the video sequence ID arranged to be the same for each picture of the same group of pictures.

According to a third aspect of the present invention there is provided a decoder for decoding the encoded pictures for forming decoded pictures, comprising a rearranger for arranging the encoded pictures in decoding order, the decoder further comprising a processor for determining which pictures belong to the same group of pictures by using the video sequence ID.

According to a fourth aspect of the present invention there is provided a software program comprising machine executable steps for performing a method for ordering encoded pictures, the method consisting of an encoding step for forming encoded pictures in an encoder, in which at least one group of pictures is formed, a picture ID is defined for each picture of the group of pictures, a transmission step for transmitting said encoded pictures to a decoder, a rearranging step for arranging the encoded pictures in decoding order, wherein in the encoding step a video sequence ID separate from the picture ID is defined for the encoded pictures.

According to a fifth aspect of the present invention there is provided a signal including encoded pictures, at least one group of pictures is formed from the encoded pictures, a picture ID is defined for each picture of the group of pictures, wherein a video sequence ID separate from the picture ID is defined in the signal for the encoded pictures, the video sequence ID being the same for each picture of the same group of pictures.

According to a sixth aspect of the present invention there is provided a method for ordering encoded pictures comprising a first and a second encoded picture, at least a first transmission unit is formed on the basis of the first encoded picture, at least a second transmission unit is formed on the basis of the second encoded picture, wherein a first identifier is defined for said first transmission unit and a second identifier is defined for said second transmission unit, the first and the second identifiers being indicative of the respective decoding order of information included in the first transmission unit and information included in the second transmission unit.

According to a seventh aspect of the present invention there is provided a device for ordering encoded pictures comprising a first and a second encoded picture, the device comprising an arranger for forming at least a first transmission unit on the basis of the first encoded picture and at least a second transmission unit on the basis of the second encoded picture, the device further comprising a definer for defining a first identifier for said first transmission unit and a second identifier for said second transmission unit, the first and the second identifiers being indicative of the respective decoding order of information included in the first transmission unit and information included in the second transmission unit.

According to a eighth aspect of the present invention there is provided an encoder for encoding pictures and for ordering encoded pictures comprising a first and a second encoded picture, the encoder comprising an arranger for forming at least a first transmission unit on the basis of the first encoded picture and at least a second transmission unit on the basis of the second encoded picture, the encoder further comprising a definer for defining a first identifier for said first transmission unit and a second identifier for said second transmission unit, the first and the second identifiers being indicative of the respective decoding order of information included in the first transmission unit and information included in the second transmission unit.

According to a ninth aspect of the present invention there is provided a decoder for decoding the encoded pictures for forming decoded pictures, the encoded pictures comprising a first and a second encoded picture transmitted in at least a first transmission unit formed on the basis of the first encoded picture and in at least a second transmission unit formed on the basis of the second encoded picture, the decoder further comprising a processor for determining the decoding order of information included in the first transmission unit and information included in the second transmission unit on the basis of a first identifier defined for said first transmission unit and a second identifier defined for said second transmission unit.

According to a tenth aspect of the present invention there is provided a system comprising an encoder for encoding pictures and for ordering encoded pictures comprising a first and a second encoded picture, the encoder comprising an arranger for forming at least a first transmission unit on the basis of the first encoded picture and at least a second transmission unit on the basis of the second encoded picture, and a decoder for decoding the encoded pictures, the system further comprising in the encoder a definer for defining a first identifier for said first transmission unit and a second identifier for said second transmission unit, the first and the second identifiers being indicative of the respective decoding order of information included in the first transmission unit and information included in the second transmission unit, and a processor in the decoder for determining the decoding order of information included in the first transmission unit and information included in the second transmission unit on the basis of said first identifier and said second identifier.

According to a eleventh aspect of the present invention there is provided a computer program comprising machine executable steps for performing a method for ordering encoded pictures comprising a first and a second encoded picture, for forming at least a first transmission unit on the basis of the first encoded picture, and at least a second transmission unit on the basis of the second encoded picture, the computer program further comprising machine executable steps for defining a first identifier for said first transmission unit and a second identifier for said second transmission unit, the first and the second identifiers being indicative of the respective decoding order of information included in the first transmission unit and information included in the second transmission unit.

According to a twelfth aspect of the present invention there is provided a computer program product for storing a computer program comprising machine executable steps for performing a method for ordering encoded pictures comprising a first and a second encoded picture, for forming at least a first transmission unit on the basis of the first encoded picture, and at least a second transmission unit on the basis of the second encoded picture, the computer program further comprising machine executable steps for defining a first identifier for said first transmission unit and a second identifier for said second transmission unit, the first and the second identifiers being indicative of the respective decoding order of information included in the first transmission unit and information included in the second transmission unit.

According to a thirteenth aspect of the present invention there is provided a signal including at least a first transmission unit formed on the basis of a first encoded picture, and at least a second transmission unit formed on the basis of a second encoded picture, the signal further including a first identifier defined for said first transmission unit and a second identifier defined for said second transmission unit, the first and the second identifiers being indicative of the respective decoding order of information included in the first transmission unit and information included in the second transmission unit.

According to a fourteenth aspect of the present invention there is provided a module for ordering encoded pictures for transmission, the encoded pictures comprising a first and a second encoded picture, the module comprising an arranger for forming at least a first transmission unit on the basis of the first encoded picture and at least a second transmission unit on the basis of the second encoded picture, the module further comprising a definer for defining a first identifier for said first transmission unit and a second identifier for said second transmission unit, the first and the second identifiers being indicative of the respective decoding order of information included in the first transmission unit and information included in the second transmission unit.

According to a fifteenth aspect of the present invention there is provided a module for reordering encoded pictures for decoding, the encoded pictures comprising a first and a second encoded picture transmitted in at least a first transmission unit formed on the basis of the first encoded picture and in at least a second transmission unit formed on the basis of the second encoded picture, the module further comprising a processor for determining the decoding order of information included in the first transmission unit and information included in the second transmission unit on the basis of a first identifier defined for said first transmission unit and a second identifier defined for said second transmission unit.

The present invention improves the reliability of the coding systems. By using the present invention the correct decoding order of the pictures can be more reliably determined than in prior art systems even if some packets of a video stream are not available in the decoder.

DETAILED DESCRIPTION OF THE INVENTION

Figure 8:
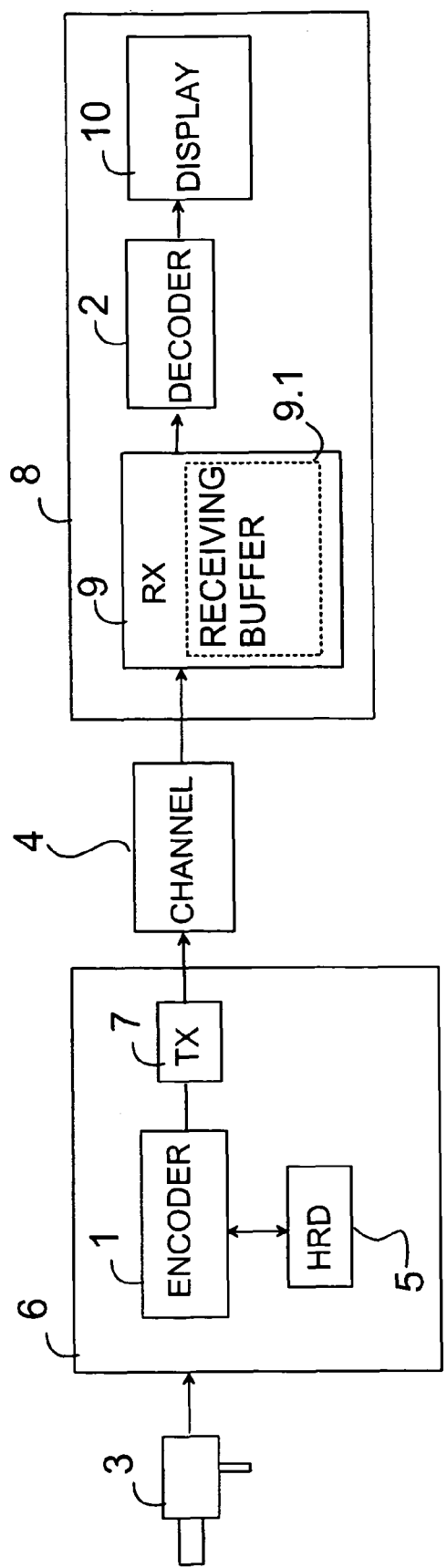
FIG. 8 depicts an advantageous embodiment of the system according to the present invention.
Figure 9:
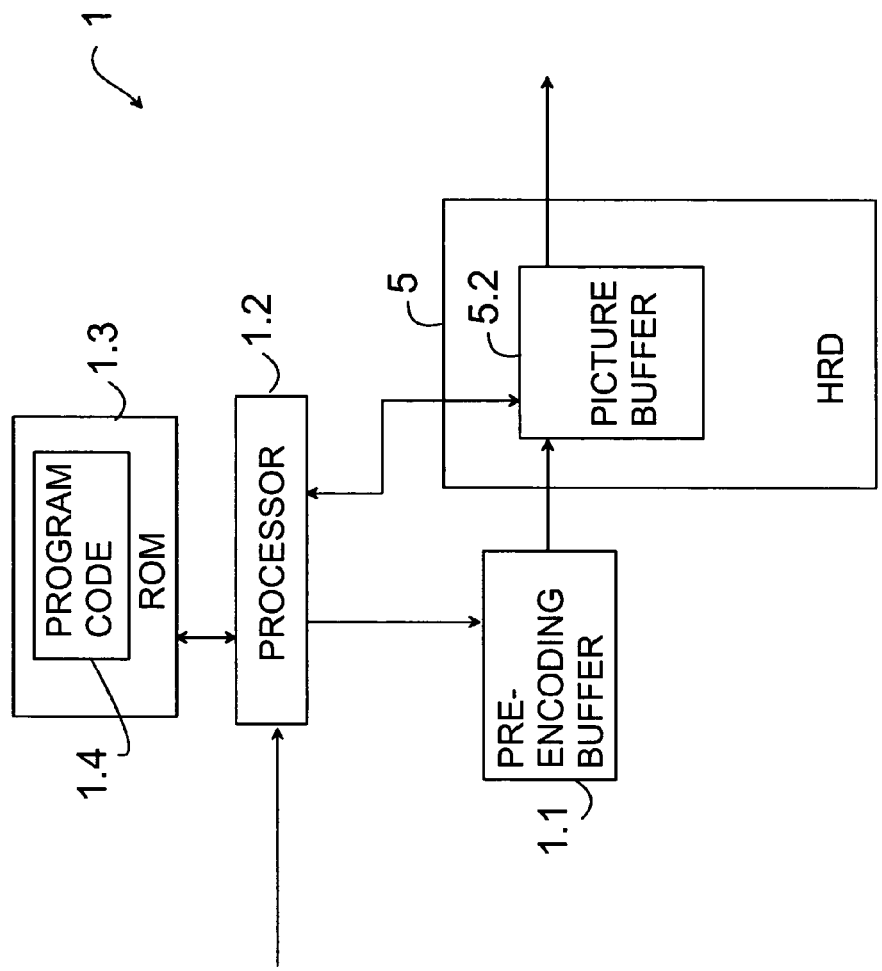
FIG. 9 depicts an advantageous embodiment of the encoder according to the present invention.
Figure 10:
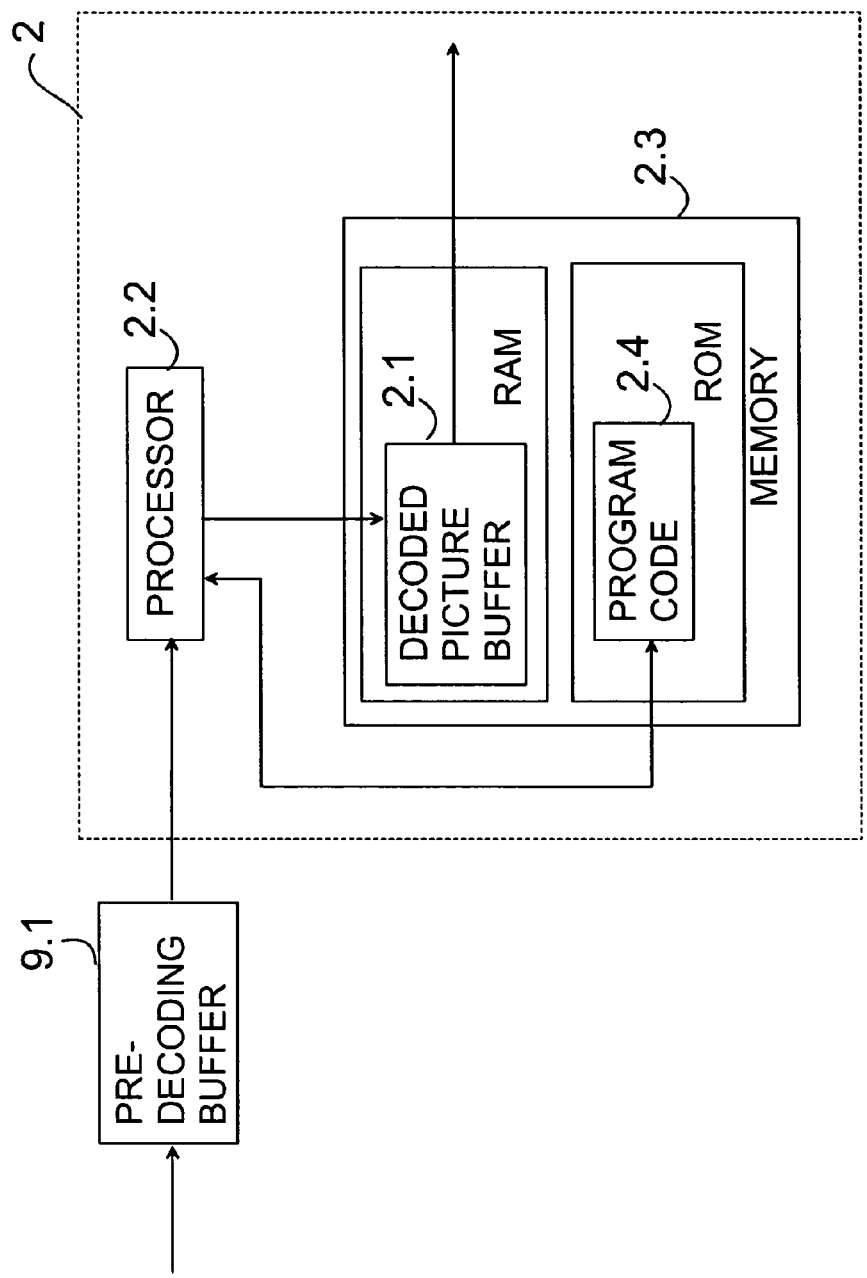
FIG. 10 depicts an advantageous embodiment of the decoder according to the present invention, FIG. 11a discloses an example of the NAL packetization format which can be used with the present invention, and FIG. 11b discloses another example of the NAL packet format which can be used with the present invention.

In the following the invention will be described in more detail with reference to the system of FIG. 8, the encoder 1 and optional hypothetical reference decoder (HRD) 5 of FIG. 9 and decoder 2 of FIG. 10. The pictures to be encoded can be, for example, pictures of a video stream from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 9) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6. The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In JVT the display order and the decoding order of the pictures are not necessarily the same, wherein the reference picture has to be stored in a buffer (e.g. in the encoding buffer 1.1) as long as it is used as a reference picture. The encoder 1 also inserts information on display order of the pictures into the transmission stream. In practice, either the timing information SEI message or timestamps external to the JVT syntax (such as RTP timestamps) can be used.

From the encoding process the encoded pictures are moved to an encoded picture buffer 1.2, if necessary. The encoded pictures are transmitted from the encoder 1 to the decoder 2 via the transmission channel 4. In the decoder 2 the encoded pictures are decoded to form uncompressed pictures corresponding as much as possible to the encoded pictures. Each decoded picture is buffered in the decoded picture buffer (DPB) 2.1 of the decoder 2 unless it is displayed substantially immediately after the decoding and is not used as a reference picture. In the system according to the present invention both the reference picture buffering and the display picture buffering are combined and they use the same decoded picture buffer 2.1. This eliminates the need for storing the same pictures in two different places thus reducing the memory requirements of the decoder 2.

The decoder 1 also includes a memory 2.3 and a processor 2.2 in which the decoding tasks according to the invention can be applied. The memory 2.3 and the processor 2.2 can be common with the receiving device 8 or the receiving device 8 can have another processor and/or memory (not shown) for other functions of the receiving device 8.

The payload format of RTP packets is defined as a number of different payload structures depending on need. However, which structure a received RTP packet contains is evident from the first byte of the payload. This byte will always be structured as a NAL unit header. The NAL unit type field indicates which structure is present. The possible structures are: Single NAL Unit Packet, Aggregation packet and Fragmentation unit. The Single NAL Unit Packet contains only a single NAL unit in the payload. The NAL header type field will be equal to the original NAL unit type, i.e., in the range of 1 to 23, inclusive. The Aggregation packet type is used to aggregate multiple NAL units into a single RTP payload. This packet exists in four versions, the Single-Time Aggregation Packet type A (STAP-A), the Single-Time Aggregation Packet type B (STAP-B), Multi-Time Aggregation Packet (MTAP) with 16 bit offset (MTAP16), and Multi-Time Aggregation Packet (MTAP) with 24 bit offset (MTAP24). The NAL unit type numbers assigned for STAP-A, STAP-B, MTAP16, and MTAP24 are 24, 25, 26, and 27 respectively. The Fragmentation unit is used to fragment a single NAL unit over multiple RTP packets. It exists with two versions identified with the NAL unit type numbers 28 and 29.

There are three cases of packetization modes defined for RTP packet transmission:
  Single NAL unit mode,
  Non-interleaved mode, and
  Interleaved mode.

The single NAL unit mode is targeted for conversational systems that comply with ITU-T Recommendation H.241. The non-interleaved mode is targeted for conversational systems that may not comply with ITU-T Recommendation H.241. In the non-interleaved mode NAL units are transmitted in NAL unit decoding order. The interleaved mode is targeted for systems that do not require very low end-to-end latency. The interleaved mode allows transmission of NAL units out of NAL unit decoding order.

The packetization mode in use may be signaled by the value of the optional packetization-mode MIME parameter or by external means. The used packetization mode governs which NAL unit types are allowed in RTP payloads.

In the interleaved packetization mode, the transmission order of NAL units is allowed to differ from the decoding order of the NAL units. Decoding order number (DON) is a field in the payload structure or a derived variable that indicates the NAL unit decoding order.

The coupling of transmission and decoding order is controlled by the optional interleaving-depth MIME parameter as follows. When the value of the optional interleaving-depth MIME parameter is equal to 0 and transmission of NAL units out of their decoding order is disallowed, the transmission order of NAL units conforms to the NAL unit decoding order. When the value of the optional interleaving-depth MIME parameter is greater than 0 or transmission of NAL units out of their decoding order is allowed, in particular,
  the order of NAL units in an Multi-Time Aggregation Packet 16 (MTAP16) and an Multi-Time Aggregation Packet 24 (MTAP24) is not required to be the NAL unit decoding order, and
  the order of NAL units composed by decapsulating Single-Time Aggregation Packets B (STAP-B), MTAPs, and Fragmentation Units B (FU-B) in two consecutive packets is not required to be the NAL unit decoding order.

The RTP payload structures for a single NAL unit packet, an STAP-A, and an FU-A do not include DON. STAP-B and FU-B structures include DON, and the structure of MTAPs enables derivation of DON.

If a transmitter wants to encapsulate one NAL unit per packet and transmit packets out of their decoding order, STAP-B packet type can be used.

In the single NAL unit packetization mode, the transmission order of NAL units is the same as their NAL unit decoding order. In the non-interleaved packetization mode, the transmission order of NAL units in single NAL unit packets and STAP-As, and FU-As is the same as their NAL unit decoding order. The NAL units within a STAP appear in the NAL unit decoding order.

Due to the fact that H.264 allows the decoding order to be different from the display order, values of RTP timestamps may not be monotonically non-decreasing as a function of RTP sequence numbers.

The DON value of the first NAL unit in transmission order may be set to any value. Values of DON are in the range of 0 to 65535, inclusive. After reaching the maximum value, the value of DON wraps around to 0.

The decoding order of two NAL units contained in any STAP-B, MTAP, or a series of fragmentation units starting with an FU-B is determined as follows. Let the value of DON of one NAL unit be D1 and the value of DON of another NAL unit be D2. If D1 equals to D2, then the NAL unit decoding order of the two NAL units can be whichever. If D1<D2 and D2−D1<32768, or if D1>D2 and D1−D2>=32768, then the NAL unit having a value of DON equal to D1 precedes the NAL unit having a value of DON equal to D2 in NAL unit decoding order. If D1<D2 and D2−D1>=32768, or if D1>D2 and D1−D2<32768, then the NAL unit having a value of DON equal to D2 precedes the NAL unit having a value of DON equal to D1 in NAL unit decoding order. Values of DON related fields are such that the decoding order determined by the values of DON as specified above conforms to the NAL unit decoding order. If the order of two consecutive NAL units in the NAL unit stream is switched and the new order still conforms to the NAL unit decoding order, the NAL units may have the same value of DON. For example, when arbitrary slice order is allowed by the video coding profile in use, all the coded slice NAL units of a coded picture are allowed to have the same value of DON. Consequently, NAL units having the same value of DON can be decoded in any order, and two NAL units having a different value of DON should be passed to the decoder in the order specified above. When two consecutive NAL units in the NAL unit decoding order have a different value of DON, the value of DON for the second NAL unit in decoding order should be the value of DON for the first NAL unit in decoding order incremented by one. Receivers should not expect that the absolute difference of values of DON for two consecutive NAL units in the NAL unit decoding order is equal to one even in case of error-free transmission. An increment by one is not required, because at the time of associating values of DON to NAL units, it may not be known, whether all NAL units are delivered to the receiver. For example, a gateway may not forward coded slice NAL units of non-reference pictures or SEI NAL units, when there is a shortage of bitrate in the network to which the packets are forwarded. In another example a live broadcast is interrupted by pre-encoded content such as commercials from time to time. The first intra picture of a pre-encoded clip is transmitted in advance to ensure that it is readily available in the receiver. At the time of transmitting the first intra picture, the originator does not exactly know how many NAL units are going to be encoded before the first intra picture of the pre-encoded clip follows in decoding order. Thus, the values of DON for the NAL units of the first intra picture of the pre-encoded clip have to be estimated at the time of transmitting them and gaps in values of DON may occur.

Encoding

Let us now consider the encoding-decoding process in more detail. Pictures from the video source 3 are entered to the encoder 1 and advantageously stored in the pre-encoding buffer 1.1. The encoding process is not necessarily started immediately after the first picture is entered to the encoder, but after a certain amount of pictures are available in the encoding buffer 1.1. Then the encoder 1 tries to find suitable candidates from the pictures to be used as the reference frames. The encoder 1 then performs the encoding to form encoded pictures. The encoded pictures can be, for example, predicted pictures (P), bi-predictive pictures (B), and/or intra-coded pictures (I). The intra-coded pictures can be decoded without using any other pictures, but other type of pictures need at least one reference picture before they can be decoded. Pictures of any of the above mentioned picture types can be used as a reference picture.

The encoder advantageously attaches two time stamps to the pictures: a decoding time stamp (DTS) and output time stamp (OTS). The decoder can use the time stamps to determine the correct decoding time and time to output (display) the pictures. However, those time stamps are not necessarily transmitted to the decoder or it does not use them.

Figure 1:
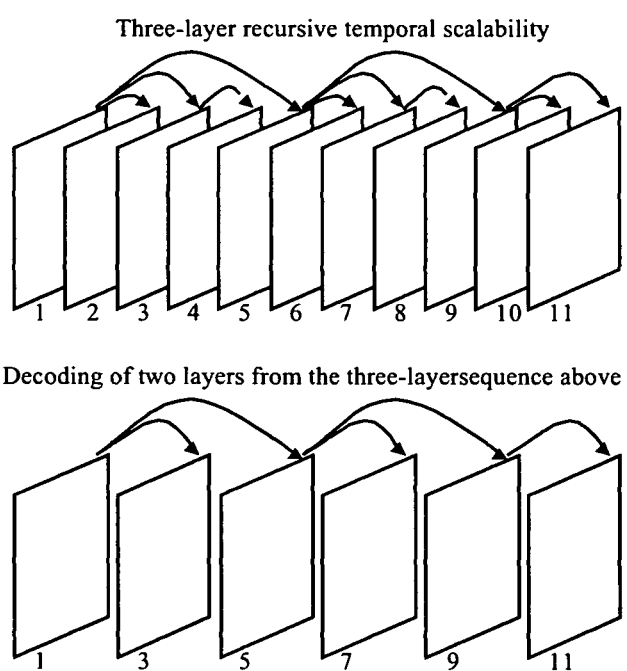
FIG. 1 shows an example of a recursive temporal scalability scheme.
Figure 2:
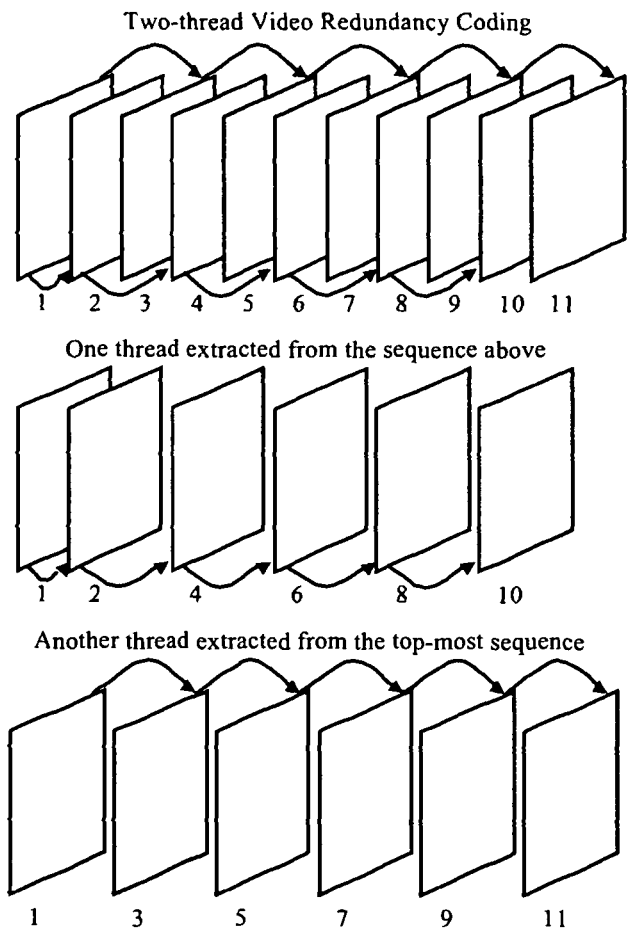
FIG. 2 depicts a scheme referred to as Video Redundancy Coding, where a sequence of pictures is divided into two or more independently coded threads in an interleaved manner.
Figure 3:
FIG. 3 presents an example of a prediction structure potentially improving compression efficiency.
Figure 4:
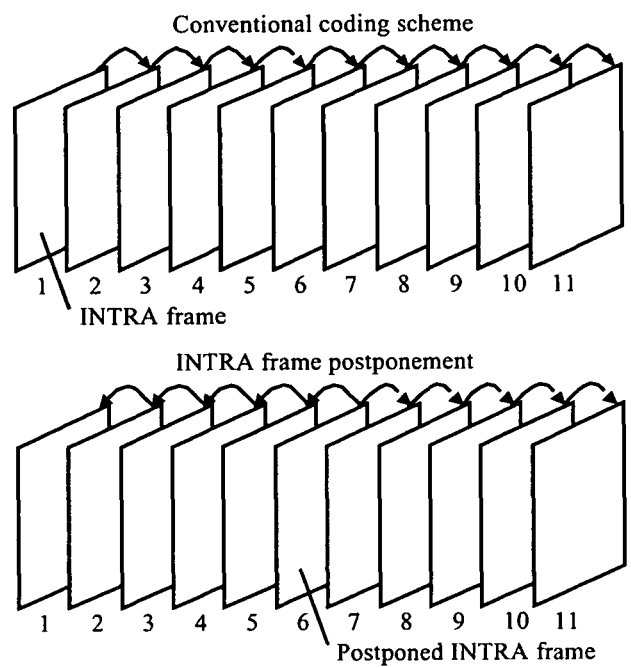
FIG. 4 presents an example of the intra picture postponement method that can be used to improve error resiliency, FIGS. 5a and 5b disclose different prior art numbering schemes for pictures of encoded video stream, FIG. 6a discloses an example of a picture stream containing sub-sequences at layer 1, FIG. 6b discloses an example of a picture stream containing two independent group of pictures having sub-sequences at layer 1, FIG. 6c discloses an example of a picture stream of different independent group of pictures, FIG. 7 discloses another example of a picture stream containing sub-sequences at layer 1.
Figure 6A:
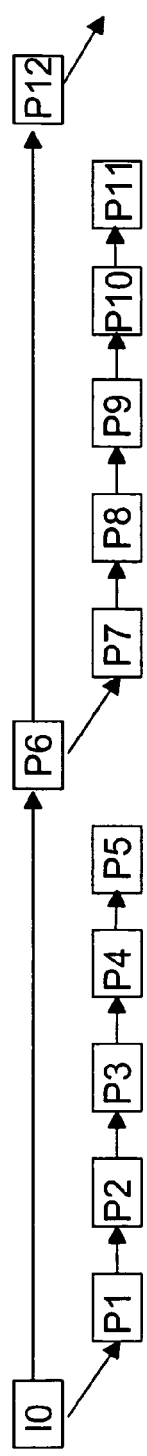
Figure 6B:
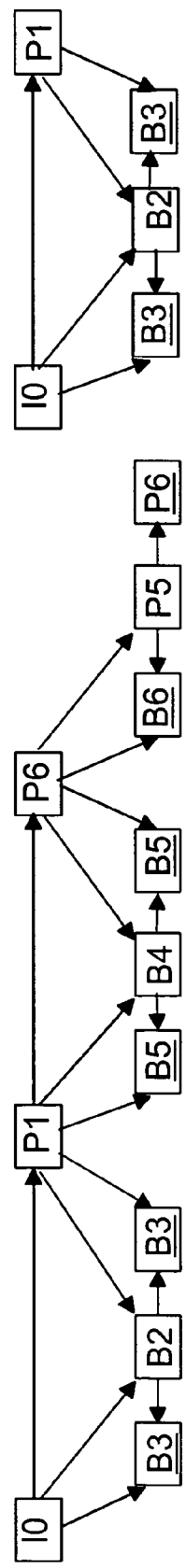
Figure 6C:
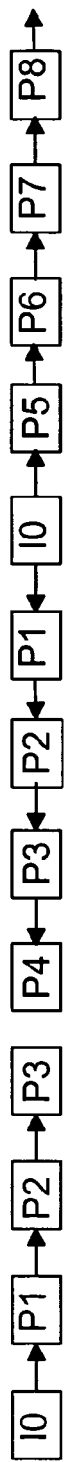
Figure 7:
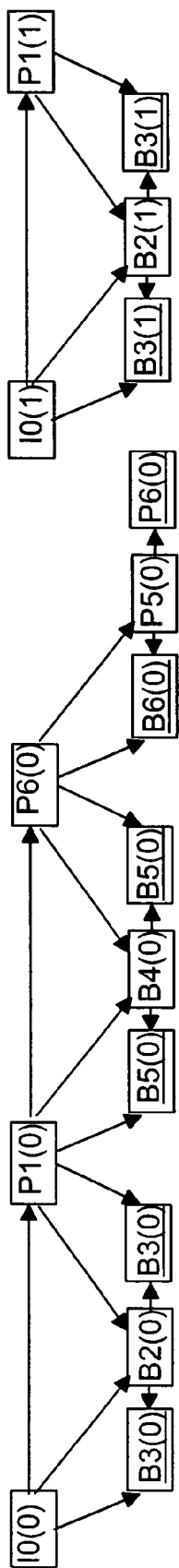

The encoder also forms sub-sequences on one or more layers above the lowest layer 0. The sub-sequences on layer 0 are independently decodable, but the pictures on higher layers may depend on pictures on some lower layer or layers. In the example of FIG. 6*a* there are two layers: layer 0 and layer 1. The pictures I0, P6 and P12 belong to the layer 0 while other pictures P1-P5, P7-P11 shown on FIG. 6*a* belong to the layer 1. Advantageously, the encoder forms groups of pictures (GOP) so that each picture of one GOP can be reconstructed by using only the pictures in the same GOP. In other words, one GOP contains at least one independently decodable picture and all the other pictures for which the independently decodable picture is a reference picture or a first reference picture in the chain of reference pictures. In the example of FIG. 7, there are two independent groups of pictures. The first independent group of pictures includes the pictures I0(0), P1(0), P3(0) on layer 0, and pictures B2(0), 2×B3(0), B4(0), 2×B5(0), B6(0), P5(0), P6(0) on layer 1. The second independent group of pictures includes the pictures I0(1), and P1(1) on layer 0, and pictures 2×B3(1) and B2(1) on layer 1. The pictures on layer 1 of each independent group of pictures are further arranged as sub-sequences. The first sub-sequence of the first independent group of pictures contains pictures B3(0), B2(0), B3(0), the second sub-sequence contains pictures B5(0), B4(0), B5(0), and the third sub-sequence contains pictures B6(0), P5(0), P6(0). The sub-sequence of the second independent group of pictures contains pictures B3(1), B2(1), B3(1). The numbers in brackets indicate the video sequence ID defined for the independent group of pictures in which the picture belongs.

The video sequence ID is transferred for each picture. It can be conveyed within the video bitstream, such as in the Supplemental Enhancement Information data. The video sequence ID can also be transmitted in the header fields of the transport protocol, such as within the RTP payload header of the JVT coding standard. The video sequence ID according to the presented partitioning to independent GOPs can be stored in the metadata of the video file format, such as in the MPEG-4 AVC file format.

Another advantageous method for signalling decoding order information in the video bitstream is briefly disclosed in the following. The encoder initialises a decoding order number (DON) to an appropriate starting value, e.g. 0. An increasing numbering scheme with wrap around is assumed here, having a certain maximum value. If, for example, the decoding order number is 16-bit unsigned integer, the maximum value is 65535. The encoder forms one or more NAL units from each primary encoded picture. The encoder can define the same decoding order number for each NAL unit of the same picture, and if redundant coded pictures (sub-sequences on higher layers) exist, the encoder can assign a different DON for NAL units of those redundant coded pictures. When the whole primary encoded picture and its possible redundant encoded pictures are encoded, the encoder begins to handle the next primary coded picture in decoding order. The encoder increments the decoding order number preferably by one, if the value of the decoding order number is smaller than said maximum value. If the decoding order number has the maximum value, the encoder sets the decoding order value to the minimum value which preferably is 0. Then, the encoder forms NAL units from said next primary encoded picture and assigns them the current value of the decoding order number. Respectively, if there exists any redundant encoded pictures of the same primary encoded picture, those are also transformed into NAL units. The operation continues until all the primary encoded pictures and respective redundant encoded pictures, if any, are handled. The transmitting device can begin to transmit the NAL units before all pictures are handled.

If the encoder is aware that the far-end decoder is incapable of handling the received slices in arbitrary order (i.e., out of raster scan order), the encoder should assign an ascending value of DON for each slice of a primary coded picture in raster scan order. That is, if a slice is transmitted in a single NAL unit each successive NAL unit has a different value of DON. If a slice is transmitted as data partition NAL units, each data partition NAL unit of a slice can share the same value of DON. For a slice of a redundant coded picture, the encoder assigns a value of DON that is larger than the value of DON of the corresponding slice in the corresponding primary coded picture.

In the receiver, the decoding order numbers can be used to determine the correct decoding order of the encoded pictures.

Figure 11A:
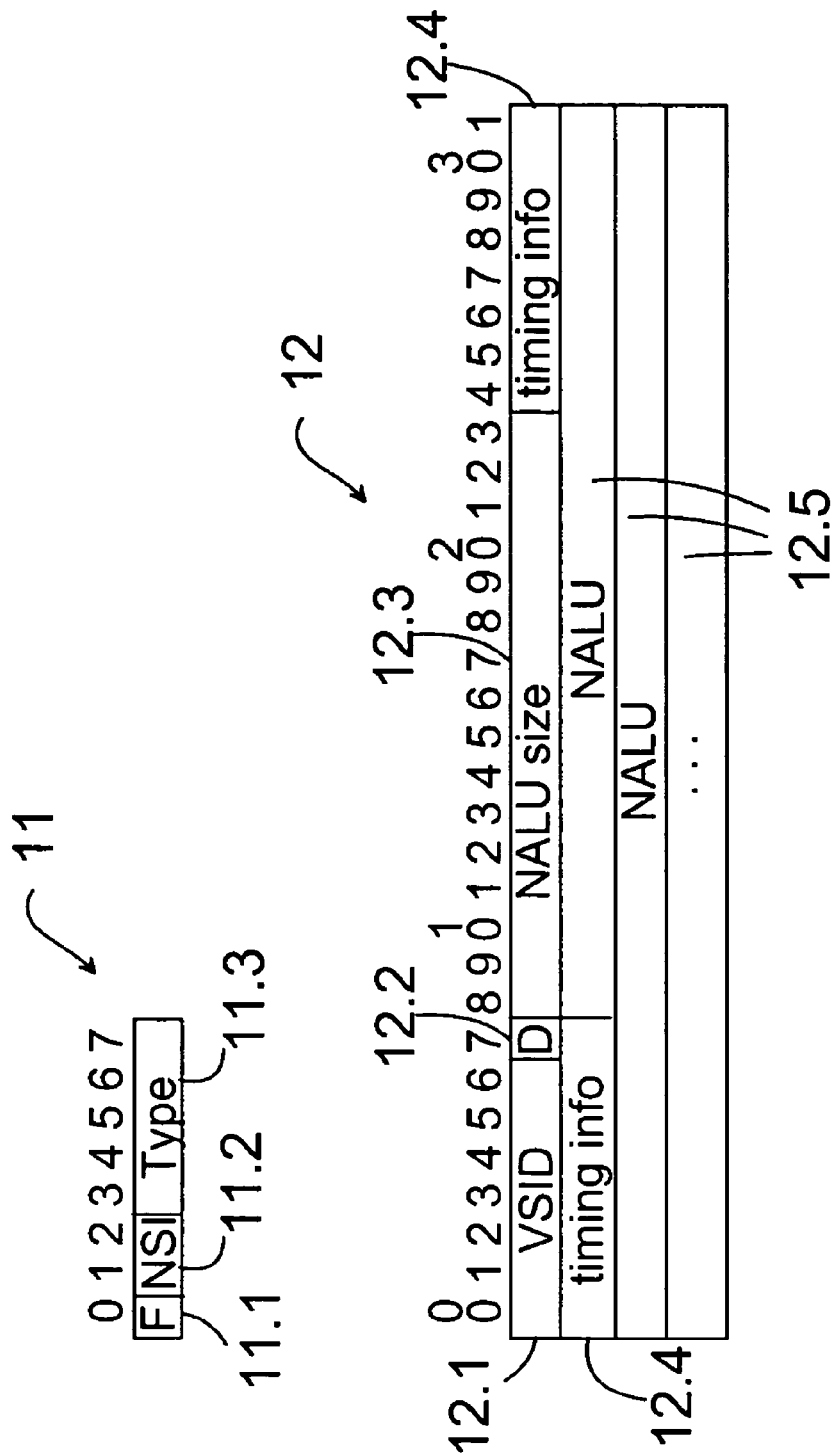
Figure 11B:
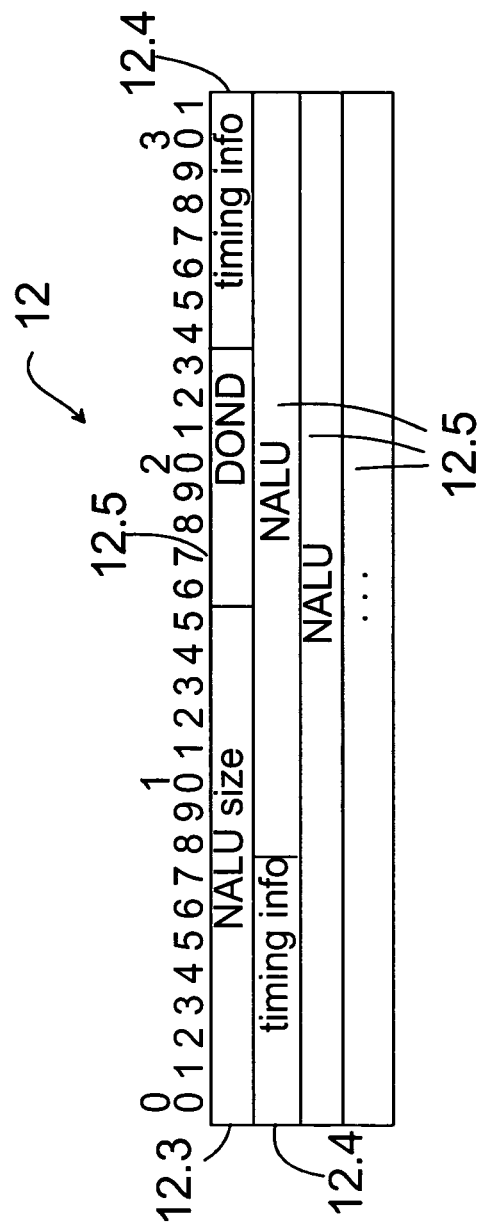

FIGS. 11a and 11b disclose examples of the NAL packet formats which can be used with the present invention. The packet contains a header 11 and a payload part 12. The header 11 contains advantageously an error indicator field 11.1 (F, Forbidden), a priority field 11.2, and a type field 11.3. The error indicator field 11.1 indicates a bit error free NAL unit. Advantageously, when the error indicator field is set, the decoder is advised that bit errors may be present in the payload or in the NALU type octet. Decoders that are incapable of handling bit errors can then discard such packets. The priority field 11.2 is used for indicating the importance of the picture encapsulated in the payload part 12 of the packet. In an example implementation, the priority field can have four different values as follows. A value of 00 indicates that the content of the NALU is not used to reconstruct reference pictures (that can be used for future reference). Such NALUs can be discarded without risking the integrity of the reference pictures. Values above 00 indicate that the decoding of the NALU is required to maintain the integrity of the reference pictures. Furthermore, values above 00 indicate the relative transport priority, as determined by the encoder. Intelligent network elements can use this information to protect more important NALUs better than less important NALUs. 11 is the highest transport priority, followed by 10, then by 01 and, finally, 00 is the lowest.

The payload part 12 of the NALU contains at least a video sequence ID field 12.1, a field indicator 12.2, size field 12.3, timing info 12.4 and the encoded picture information 12.5. The video sequence ID field 12.1 is used for storing the number of the video sequence in which the picture belongs to. The field indicator 12.2 is used to signal whether the picture is a first or a second frame when two-frame picture format is used. Both frames may be coded as separate pictures. The first field indicator equal to 1 advantageously signals that the NALU belongs to a coded frame or a coded field that precedes the second coded field of the same frame in decoding order. The first field indicator equal to 0 signals that the NALU belongs to a coded field that succeeds the first coded field of the same frame in decoding order. The timing info field 11.3 is used for transforming time related information, if necessary.

The NAL units can be delivered in different kinds of packets. In this advantageous embodiment the different packet formats include simple packets and aggregation packets. The aggregation packets can further be divided into single-time aggregation packets and multi-time aggregation packets.

A simple packet according to this invention consists of one NALU. A NAL unit stream composed by decapsulating Simple Packets in RTP sequence number order should conform to the NAL unit delivery order.

Aggregation packets are the packet aggregation scheme of this payload specification. The scheme is introduced to reflect the dramatically different MTU sizes of two different type of networks—wireline IP networks (with an MTU size that is often limited by the Ethernet MTU size—roughly 1500 bytes), and IP or non-IP (e.g. H.324/M) based wireless networks with preferred transmission unit sizes of 254 bytes or less. In order to prevent media transcoding between the two worlds, and to avoid undesirable packetization overhead, a packet aggregation scheme is introduced.

Single-Time Aggregation Packet (STAP) aggregate NALUs with identical NALU-time. Respectively, Multi-Time Aggregation Packets (MTAP) aggregate NALUs with potentially differing NALU-time. Two different MTAPs are defined that differ in the length of the NALU timestamp offset. The term NALU-time is defined as the value the RTP timestamp would have if that NALU would be transported in its own RTP packet.

MTAPs and STAP share the following non-limiting packetization rules according to an advantageous embodiment of the present invention. The RTP timestamp must be set to the minimum of the NALU times of all the NALUs to be aggregated. The Type field of the NALU type octet must be set to the appropriate value as indicated in table 1. The error indicator field 11.1 must be cleared if all error indicator fields of the aggregated NALUs are zero, otherwise it must be set.

TABLE 1

| Type | Packet | Timestamp offset field length (in bits) |
|---|---|---|
| 0×18 | STAP | 0 |
| 0×19 | MTAP16 | 16 |
| 0×20 | MTAP24 | 24 |

The NALU Payload of an aggregation packet consists of one or more aggregation units. An aggregation packet can carry as many aggregation units as necessary, however the total amount of data in an aggregation packet obviously must fit into an IP packet, and the size should be chosen such that the resulting IP packet is smaller than the MTU size.

Single-Time Aggregation Packet (STAP) should be used whenever aggregating NALUs that share the same NALU-time. The NALU payload of an STAP consists of the video sequence ID field 12.1 (e.g. 7 bits) and the field indicator 12.2 followed by Single-Picture Aggregation Units (SPAU). Single-Time Aggregation Packet type B (STAP-B) includes also the DON.

A video sequence according to this specification can be any part of NALU stream that can be decoded independently from other parts of the NALU stream.

A frame consists of two fields that may be coded as separate pictures. The first field indicator equal to 1 signals that the NALU belongs to a coded frame or a coded field that precedes the second coded field of the same frame in decoding order. The first field indicator equal to 0 signals that the NALU belongs to a coded field that succeeds the first coded field of the same frame in decoding order.

A Single-Picture Aggregation Unit consists of e.g. 16-bit unsigned size information that indicates the size of the following NALU in bytes (excluding these two octets, but including the NALU type octet of the NALU), followed by the NALU itself including its NALU type byte.

A Multi-Time Aggregation Packet (MTAP) has a similar architecture as an STAP. It consists of the NALU header byte and one or more Multi-Picture Aggregation Units. The choice between the different MTAP fields is application dependent—the larger the timestamp offset is the higher is the flexibility of the MTAP, but the higher is also the overhead.

Two different Multi-Time Aggregation Units are defined in this specification. Both of them consist of e.g. 16 bits unsigned size information of the following NALU (same as the size information of in the STAP). In addition to these 16 bits there are also the video sequence ID field 12.1 (e.g. 7 bits), the field indicator 12.2 and n bits of timing information for this NALU, whereby n can e.g. be 16 or 24. The timing information field has to be set so that the RTP timestamp of an RTP packet of each NALU in the MTAP (the NALU-time) can be generated by adding the timing information from the RTP timestamp of the MTAP.

In another alternative embodiment the Multi-Time Aggregation Packet (MTAP) consists of the NALU header byte, a decoding order number base (DONB) field 12.1 (e.g. 16 bits), and one or more Multi-Picture Aggregation Units. The two different Multi-Time Aggregation Units are in this case defined as follows. Both of them consist of e.g. 16 bits unsigned size information of the following NALU (same as the size information of in the STAP). In addition to these 16 bits there are also the decoding order number delta (DOND) field 12.5 (e.g. 7 bits), and n bits of timing information for this NALU, whereby n can e.g. be 16 or 24. DON of the following NALU is equal to DONB+DOND. The timing information field has to be set so that the RTP timestamp of an RTP packet of each NALU in the MTAP (the NALU-time) can be generated by adding the timing information from the RTP timestamp of the MTAP. DONB may contain the smallest value of DON among the NAL units of the MTAP.

Transmission

The transmission and/or storing of the encoded pictures (and the optional virtual decoding) can be started immediately after the first encoded picture is ready. This picture is not necessarily the first one in decoder output order because the decoding order and the output order may not be the same.

When the first picture of the video stream is encoded the transmission can be started. The encoded pictures are optionally stored to the encoded picture buffer 1.2. The transmission can also start at a later stage, for example, after a certain part of the video stream is encoded.

The decoder 2 should also output the decoded pictures in correct order, for example by using the ordering of the picture order counts, and hence the reordering process need be defined clearly and normatively.

De-Packetizing

The de-packetization process is implementation dependent. Hence, the following description is a non-restrictive example of a suitable implementation. Other schemes may be used as well. Optimizations relative to the described algorithms are likely possible.

The general concept behind these de-packetization rules is to reorder NAL units from transmission order to the NAL unit delivery order.

Decoding

Next, the operation of the receiver 8 will be described. The receiver 8 collects all packets belonging to a picture, bringing them into a reasonable order. The strictness of the order depends on the profile employed. The received packets are advantageously stored into the receiving buffer 9.1 (pre-decoding buffer). The receiver 8 discards anything that is unusable, and passes the rest to the decoder 2. Aggregation packets are handled by unloading their payload into individual RTP packets carrying NALUs. Those NALUs are processed as if they were received in separate RTP packets, in the order they were arranged in the Aggregation Packet.

For each NAL unit stored in the buffer, the RTP sequence number of the packet that contained the NAL unit is advantageously stored and associated with the stored NAL unit. Moreover, the packet type (Simple Packet or Aggregation Packet) that contained the NAL unit is stored and associated with each stored NAL unit.

Hereinafter, let N be the value of the optional num-reorder-VCL-NAL-units parameter (interleaving-depth parameter) which specifies the maximum amount of VCL NAL units that precede any VCL NAL unit in the packet stream in NAL unit delivery order and follow the VCL NAL unit in RTP sequence number order or in the composition order of the aggregation packet containing the VCL NAL unit. If the parameter is not present, a 0 value number could be implied. When the video stream transfer session is initialized, the receiver buffers at least N pieces of VCL NAL units into the receiving buffer 9.1 before passing any packet to the decoder 2.

When the receiver buffer 9.1 contains at least N VCL NAL units, NAL units are removed from the receiver buffer 9.1 and passed to the decoder 2 in the order specified below until the buffer contains N−1 VCL NAL units.

Hereinafter, let PVSID be the video sequence ID (VSID) of the latest NAL unit passed to the decoder. All NAL units in a STAP share the same VSID. The order in which NAL units are passed to the decoder is specified as follows: If the oldest RTP sequence number in the buffer corresponds to a Simple Packet, the NALU in the Simple Packet is the next NALU in the NAL unit delivery order. If the oldest RTP sequence number in the buffer corresponds to an Aggregation Packet, the NAL unit delivery order is recovered among the NALUs conveyed in Aggregation Packets in RTP sequence number order until the next Simple Packet (exclusive). This set of NALUs is hereinafter referred to as the candidate NALUs. If no NALUs conveyed in Simple Packets reside in the buffer, all NALUs belong to candidate NALUs.

For each NAL unit among the candidate NALUs, a VSID distance is calculated as follows. If the VSID of the NAL unit is larger than PVSID, the VSID distance is equal to VSID−PVSID. Otherwise, the VSID distance is equal to 2^(number of bits used to signal VSID)−PVSID+VSID. NAL units are delivered to the decoder in ascending order of VSID distance. If several NAL units share the same VSID distance, the order to pass them to the decoder shall conform to the NAL unit delivery order defined in this specification. The NAL unit delivery order can be recovered as described in the following.

In the above the terms PVSID and VSID were used. It is obvious that also the terms PDON (the decoding order number of the previous NAL unit of an aggregation packet in NAL unit delivery order) and DON (decoding order number) can be used instead.

First, slices and data partitions are associated with pictures according to their frame numbers, RTP timestamps and first field flags: all NALUs sharing the same values of the frame number, the RTP timestamp and the first field flag belong to the same picture. SEI NALUs, sequence parameter set NALUs, picture parameter set NALUs, picture delimiter NALUs, end of sequence NALUs, end of stream NALUs, and filler data NALUs belong to the picture of the next VCL NAL unit in transmission order.

Second, the delivery order of the pictures is concluded based on nal_ref_idc, the frame number, the first field flag, and the RTP timestamp of each picture. The delivery order of pictures is in ascending order of frame numbers (in modulo arithmetic). If several pictures share the same value of frame number, the picture(s) that have nal_ref_idc equal to 0 are delivered first. If several pictures share the same value of frame number and they all have nal_ref_idc equal to 0, the pictures are delivered in ascending RTP timestamp order. If two pictures share the same RTP timestamp, the picture having first field flag equal to 1 is delivered first. Note that a primary coded picture and the corresponding redundant coded pictures are herein considered as one coded picture.

Third, if the video decoder in use does not support Arbitrary Slice Ordering, the delivery order of slices and A data partitions is in ascending order of the first_mb_in_slice syntax element in the slice header. Moreover, B and C data partitions immediately follow the corresponding A data partition in delivery order.

The following additional de-packetization rules may be used to implement an operational JVT de-packetizer: NALUs are presented to the JVT decoder in the order of the RTP sequence number. NALUs carried in an Aggregation Packet are presented in their order in the Aggregation packet. All NALUs of the Aggregation packet are processed before the next RTP packet is processed.

Intelligent RTP receivers (e.g. in Gateways) may identify lost DPAs. If a lost DPA is found, the Gateway MAY decide not to send the DPB and DPC partitions, as their information is meaningless for the JVT Decoder. In this way a network element can reduce network load by discarding useless packets, without parsing a complex bit stream.

Intelligent receivers may discard all packets that have a NAL Reference Idc of 0. However, they should process those packets if possible, because the user experience may suffer if the packets are discarded.

The DPB 2.1 contains memory places for storing a number of pictures. Those places are also called as frame stores in the description. The decoder 2 decodes the received pictures in correct order. To do so the decoder examines the video sequence ID information of the received pictures. If the encoder has selected the video sequence ID for each independent group of pictures freely, the decoder decodes the pictures of the independent group of pictures in the order in which they are received. If the encoder has defined for each independent group of pictures the video sequence ID by using incrementing (or decrementing) numbering scheme, the decoder decodes the independent group of pictures in the order of video sequence IDs. In other words, the independent group of pictures having the smallest (or biggest) video sequence ID is decoded first.

The present invention can be applied in many kind of systems and devices. The transmitting device 6 including the encoder 1 and optionally the HRD 5 advantageously include also a transmitter 7 to transmit the encoded pictures to the transmission channel 4. The receiving device 8 include the receiver 9 to receive the encoded pictures, the decoder 2, and a display 10 on which the decoded pictures can be displayed. The transmission channel can be, for example, a landline communication channel and/or a wireless communication channel. The transmitting device and the receiving device include also one or more processors 1.2, 2.2 which can perform the necessary steps for controlling the encoding/decoding process of video stream according to the invention. Therefore, the method according to the present invention can mainly be implemented as machine executable steps of the processors. The buffering of the pictures can be implemented in the memory 1.3, 2.3 of the devices. The program code 1.4 of the encoder can be stored into the memory 1.3. Respectively, the program code 2.4 of the decoder can be stored into the memory 2.3.

The invention claimed is:

1. A method for ordering encoded pictures comprising a first and a second encoded picture, comprising:
forming at least a first transmission unit on the basis of the first encoded picture, and
forming at least a second transmission unit on the basis of the second encoded picture,
the first and second transmission units being units configured for network transmission and being different from video coding units of the first and second encoded picture,
defining a first identifier of said first transmission unit and a second identifier of said second transmission unit, the first and the second identifiers being indicative of the respective decoding order of information included in the first transmission unit and information included in the second transmission unit and the first and the second identifiers being different from the video coding units of the first and the second encoded picture and from time stamps of the first and the second encoded picture.

2. The method according to claim 1, wherein the identifier is defined as an integer number.

3. The method according to claim 2, wherein a larger integer number with wrap around indicates a later decoding order.

4. The method according to claim 1, wherein said first transmission unit includes a first slice and said second transmission unit includes a second slice.

5. A device for ordering encoded pictures comprising a first and a second encoded picture, the device comprising:
an arranger for forming at least a first transmission unit on the basis of the first encoded picture and at least a second transmission unit on the basis of the second encoded picture, the first and second transmission units being units configured for network transmission and being different from video coding units of the first and second encoded picture, and
a definer for defining a first identifier of said first transmission unit and a second identifier of said second transmission unit, the first and the second identifiers being indicative of the respective decoding order of information included in the first transmission unit and information included in the second transmission unit, and the first and the second identifiers being different from the video coding units of the first and the second encoded picture and from time stamps of the first and the second encoded picture.

6. The device according to claim 5, wherein it is a gateway device.

7. The device according to claim 5, wherein it is a mobile communication device.

8. The device according to claim 5, wherein it is a streaming server.

9. An encoder for encoding pictures and for ordering encoded pictures comprising a first and a second encoded picture, the encoder comprising:
   an arranger for forming at least a first transmission unit on the basis of the first encoded picture and at least a second transmission unit on the basis of the second encoded picture, the first and second transmission units being units configured for network transmission and being different from video coding units of the first and second encoded picture, and
   a definer for defining a first identifier of said first transmission unit and a second identifier of said second transmission unit, the first and the second identifiers being indicative of the respective decoding order of information included in the first transmission unit and information included in the second transmission unit, and the first and the second identifiers being different from the video coding units of the first and the second encoded picture and from time stamps of the first and the second encoded picture.

10. The encoder according to claim 9, wherein said arranger is arranged to include a first slice into said first transmission unit and a second slice into said second transmission unit.

11. A decoder for decoding encoded pictures for forming decoded pictures, the encoded pictures comprising a first and a second encoded picture transmitted in at least a first transmission unit formed on the basis of the first encoded picture and in at least a second transmission unit formed on the basis of the second encoded picture, the first and second transmission units being units configured for network transmission and being different from video coding units of the first and second encoded picture, wherein the decoder comprises a processor for determining the decoding order of information included in the first transmission unit and information included in the second transmission unit on the basis of a first identifier of said first transmission unit and a second identifier of said second transmission unit, and the first and the second identifiers being different from the video coding units of the first and the second encoded picture and from time stamps of the first and the second encoded picture.

12. A system comprising:
   an encoder for encoding pictures and for ordering encoded pictures comprising a first and a second encoded picture, the encoder comprising an arranger for forming at least a first transmission unit on the basis of the first encoded picture and at least a second transmission unit on the basis of the second encoded picture, the first and second transmission units being units configured for network transmission and being different from video coding units of the first and second encoded picture, and
   a decoder for decoding the encoded pictures,
   wherein the system further comprises:
   in the encoder a definer for defining a first identifier of said first transmission unit and a second identifier of said second transmission unit, the first and the second identifiers being indicative of the respective decoding order of information included in the first transmission unit and information included in the second transmission unit, and the first and the second identifiers being different from the video coding units of the first and the second encoded picture and from time stamps of the first and the second encoded picture, and
   a processor in the decoder for determining the decoding order of information included in the first transmission unit and information included in the second transmission unit on the basis of said first identifier and said second identifier.

13. A non-transitory computer readable medium encoded with computer executable instructions for decoding encoded pictures to form decoded pictures, the encoded pictures comprising a first and a second encoded picture transmitted in at least a first transmission unit formed on the basis of the first encoded picture and at least a second transmission unit formed on the basis of the second encoded picture, the first and second transmission units being units configured for network transmission and being different from video coding units of the first and second encoded picture, wherein the computer program further comprises computer executable instructions for determining the decoding order of information included in the first transmission unit and information included in the second transmission unit on the basis of a first identifier of said first transmission unit and a second identifier of said second transmission unit, and the first and the second identifiers being different from the video coding units of the first and the second encoded picture and from time stamps of the first and the second encoded picture.

14. A non-transitory computer readable medium encoded with computer executable instructions for performing a method for ordering encoded pictures comprising a first and a second encoded picture, for forming at least a first transmission unit on the basis of the first encoded picture, and at least a second transmission unit on the basis of the second encoded picture, the first and second transmission units being units configured for network transmission and being different from video coding units of the first and second encoded picture, wherein the computer program further comprising computer executable instructions for defining a first identifier of said first transmission unit and a second identifier of said second transmission unit, the first and the second identifiers being indicative of the respective decoding order of information included in the first transmission unit and information included in the second transmission unit, and the first and the second identifiers being different from the video coding units of the first and the second encoded picture and from time stamps of the first and the second encoded picture.

15. A non-transitory module for ordering encoded pictures for transmission, the encoded pictures comprising a first and a second encoded picture, the module comprising:
   an arranger for forming at least a first transmission unit on the basis of the first encoded picture and at least a second transmission unit on the basis of the second encoded picture, the first and second transmission units being units configured for network transmission and being different from video coding units of the first and second encoded picture, and
   a definer for defining a first identifier of said first transmission unit and a second identifier of said second transmission unit, the first and the second identifiers being indicative of the respective decoding order of information included in the first transmission unit and information included in the second transmission unit, and the first and the second identifiers being different from the video coding units of the first and the second encoded picture and from time stamps of the first and the second encoded picture.

16. A non-transitory module for reordering encoded pictures for decoding, the encoded pictures comprising a first and a second encoded picture transmitted in at least a first transmission unit formed on the basis of the first encoded picture and in at least a second transmission unit formed on the basis of the second encoded picture, the first and second transmission units being units configured for network transmission and being different from video coding units of the first and second encoded picture, wherein the module comprises a processor for determining the decoding order of information included in the first transmission unit and information included in the second transmission unit on the basis of a first identifier of said first transmission unit and a second identifier of said second transmission unit, and the first and second identifiers being different from the video coding units of the first and the second encoded picture and from time stamps of the first and the second encoded picture.

17. The module according to claim 15, wherein said arranger is configured to include a first slice into said first transmission unit and a second slice into said second transmission unit.

18. A method for ordering encoded pictures comprising a first and a second encoded picture, comprising:
  forming at least a first transmission unit encapsulating information of the first encoded picture, and
  forming at least a second transmission unit encapsulating information of the second encoded picture,
  the first and second transmission units being configured for network transmission and being different from video coding units of the first and second encoded picture,
  defining a first identifier in said first transmission unit and a second identifier in said second transmission unit, the first and the second identifiers being indicative of the respective decoding order of information included in the first transmission unit and information included in the second transmission unit, and
  the first and the second identifiers being different from the video coding units of the first and the second encoded picture and from time stamps of the first and the second encoded picture.

19. A device comprising:
a processor, and
a memory including computer executable instructions, the memory and the computer executable instructions being configured to, in cooperation with the processor, cause the device to:
form at least a first transmission unit on the basis of the first encoded picture and at least a second transmission unit on the basis of the second encoded picture, the first and second transmission units being units configured for network transmission and being different from video coding units of the first and second encoded picture, and
define a first identifier of said first transmission unit and a second identifier of said second transmission unit, the first and the second identifiers being indicative of the respective decoding order of information included in the first transmission unit and information included in the second transmission unit, and the first and the second identifiers being different from the video coding units of the first and the second encoded picture and from time stamps of the first and the second encoded picture.

* * * * *